(12) United States Patent
Greenberg et al.

(10) Patent No.: US 12,470,658 B2
(45) Date of Patent: Nov. 11, 2025

(54) METHOD FOR IDENTIFYING CONTACT REASON OF A BUSINESS PROCESS DISCOVERED BY A DESKTOP ANALYTICS TOOL

(71) Applicant: NICE LTD., Ra'anana (IL)

(72) Inventors: Tal Greenberg, Bat-Hefer (IL); Simone Mimun, Givath Shmuel (IL); Eran Roseberg, Hogla (IL)

(73) Assignee: NICE LTD., Ra'anana (IL)

( * ) Notice: Subject to any disclaimer, the term of this patent is extended or adjusted under 35 U.S.C. 154(b) by 181 days.

(21) Appl. No.: 18/429,490

(22) Filed: Feb. 1, 2024

(65) Prior Publication Data
US 2025/0254240 A1 Aug. 7, 2025

(51) Int. Cl.
*H04M 3/51* (2006.01)
(52) U.S. Cl.
CPC ....... *H04M 3/5175* (2013.01); *H04M 3/5183* (2013.01)
(58) Field of Classification Search
None
See application file for complete search history.

(56) References Cited

U.S. PATENT DOCUMENTS

| | | | |
|---|---|---|---|
| 12,126,769 B1* | 10/2024 | Koul | H04M 3/5175 |
| 2025/0159078 A1* | 5/2025 | Corzo | H04M 3/493 |

* cited by examiner

*Primary Examiner* — Quynh H Nguyen
(74) *Attorney, Agent, or Firm* — SOROKER AGMON NORDMAN RIBA

(57) ABSTRACT

A computerized-method for identifying a contact-reason of a business-process that has been discovered by a desktop-analytics-tool. The computerized-method includes: (i) retrieving a random-sample of a preconfigured number of instances of a discovered-routine from the routines-data-store; (ii) for each instance in the random-sample of the preconfigured number of instances matching a related transcript-segment; (iii) identifying a contact-reason of each instance by operating a first-GEN-AI with LLM with a first-prompt-text including an embedded related transcript-segment; The first-GEN-AI with LLM has been trained to provide the contact-reason based on the transcript-segment embedded in the first-prompt-text, and (iv) identifying the contact-reason of the discovered-routine as the contact-reason of the business process by operating a second-GEN-AI with LLM with a second-prompt-text for aggregation of all the contact-reasons of all instances in the random-sample. The second-GEN-AI with LLM has been trained to provide a contact-reason based on the contact-reasons of all instances embedded in the second-prompt-text.

9 Claims, 21 Drawing Sheets

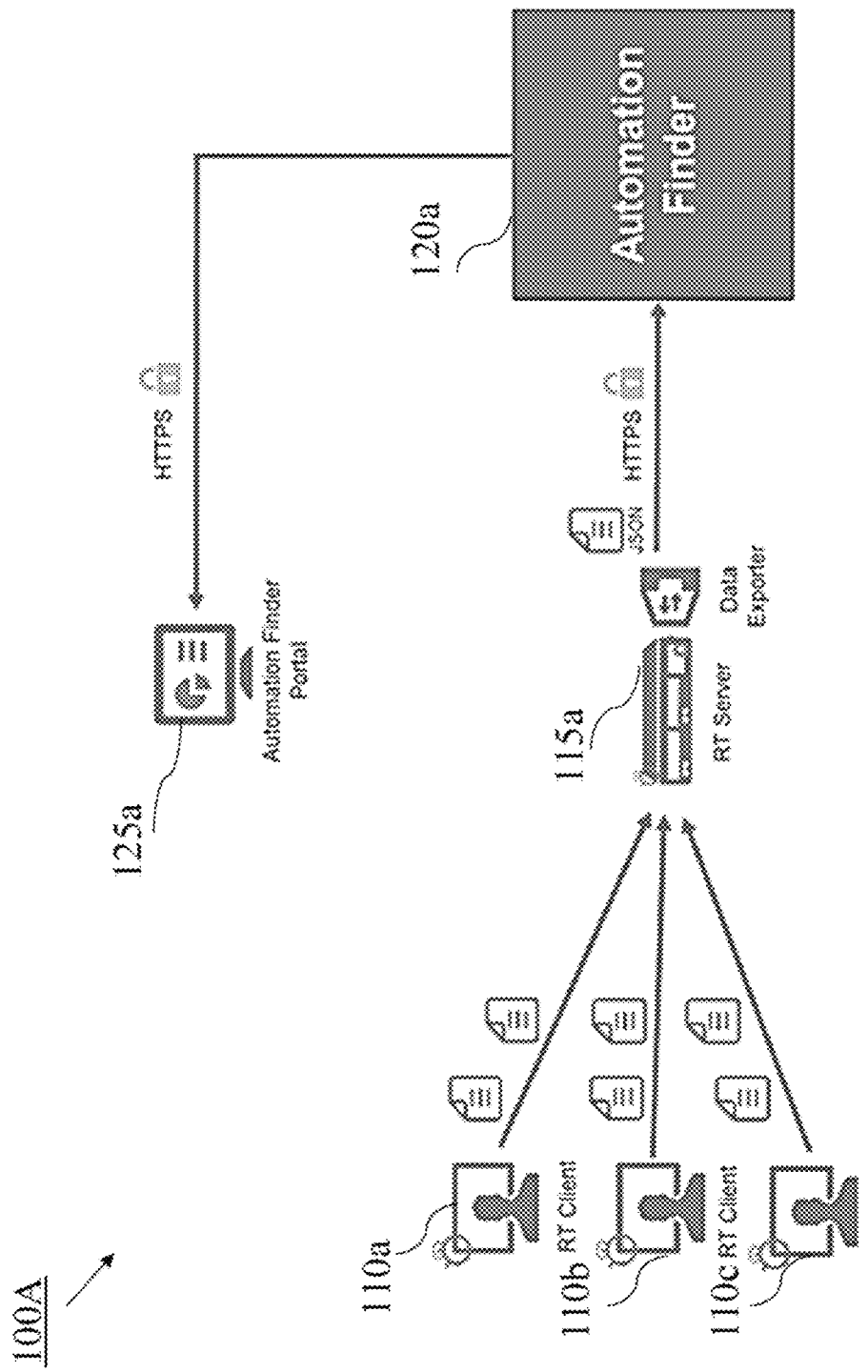

200

210 — monitoring each interaction between an agent and a customer in a contact center to: a. generate a related interaction-transcription of the interaction and store the related interaction-transcription by an analytics Application Programming Inter (API); and b. collect and store a sequence of user desktop actions which were operated via an application or across applications during the interaction by the agent to carry out the business process;

220 — operating the desktop analytics tool to find a repetitive sequence of user desktop actions which were operated via the application or across the applications during the interaction; and to determine the repetitive sequence of user desktop actions as a discovered-routine for automation of the business process. Each sequence of the repetitive sequence of user desktop actions is stored as an instance of the discovered-routine in a routine-datastore by the desktop analytics tool, with an associated, agent-id, start-timestamp, and end-timestamp;

| | |
|---|---|
| Agent | Hi, this is Terry. May I ask who I'm speaking with? |
| Caller | Hi Terry, this is Liam Davis. |
| Agent | Hi Liam. What can I help you with today? |
| Caller | I'm calling because my debit card isn't working and there's an unexpected fee charged on my account |
| Agent | Let me take a look. So it looks like there was a security block on your account, but that's been cleared so I don't think that you should have an issue using your card Oh wait, I see, it looks like the card is not activated. Have you activated the card on our website? |
| Caller | Oh, oh, no, that's embarrassing. I forgot to activate it! |
| Agent | No problem I can help with that. In the future, you can activate new cards on our website. I can confirm it's now active. |
| Caller | Perfect. Thank you. |
| Agent | Now you mentioned an unexpected fee -- let me look at that fee for you. I see a fee for international transactions. |
| Caller | Yes, the international charges were fraudulent. |
| Agent | I've submitted a claim about those but the international fee is still on my account. |
| Caller | I see. I'll just refund that fee for you. |
| Agent | And that's all set. You should see that come through on the app immediately |
| Caller | Perfect |
| Agent | Is there anything else I can help you with today? |
| Caller | No -- that's all I needed. Thanks for your help! |
| Agent | My pleasure. Have a wonderful day! |

METHOD FOR IDENTIFYING CONTACT REASON OF A BUSINESS PROCESS DISCOVERED BY A DESKTOP ANALYTICS TOOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to the field of Robotic Process Automation (RPA) solutions, and more specifically to identifying a contact reason of a business process that has been discovered by a desktop analytics tool.

BACKGROUND

In contact centers, agents perform a multitude of repetitive desktop actions via an application or across applications to carry out the same business process, commonly referred to as routines, daily. These routines may be identified by desktop analytics tools as a business process which may be a candidate for automation by a Robotic Process Automation (RPA) software robot.

Current technical solutions that implement desktop analytics tools collect millions of user desktop actions to uncover productivity gaps and surface business processes inefficiencies. This unprecedented visibility of the inefficiencies of business processes allows organizations to optimize their contact center operations and achieve substantial cost savings.

One of the main building-blocks of business process life cycle automation is operating a desktop analytics tool for identifying business processes within the enterprise that are significant candidates for automation, namely, they are feasible for automation and have high potential Return On Investment (ROI) by saving significant manual efforts and workloads when being handled by robots instead of human agents.

Businesses and organizations often struggle to harness the true potential of this data. To maximize the value organizations can make out of rich desktop user actions data, insights into the identified business processes should be provided for either the users that handle the automation of business process or an automatic action upon such identification.

In current technical solutions, the final stage of discovery of business processes and analysis process are made manually and is far from being optimal due to several reasons: (a) the identified flows may be difficult to justify; (b) other, more significant flows can be easily missed; and (c) the discovery process is biased, time consuming and very expensive.

Therefore, there is a need for a technical solution that will automatically identify a contact reason of the identified business process and determine the significant business flows. A significant challenge for the analyst lays in comprehending the scope and purpose, e.g., contact reason, of each business process, i.e., routine or task which is a series of desktop actions performed via one or more applications and across them. The current lack of clarity hampers the ability to provide suggestions to the analyst, improve performance and create valuable automations.

Among the many routines agents perform during their shifts in the contact center, only a few are easily understood by analysts. There is a lack of methods or processes to comprehend why agents engage in a specific series of desktop activities that has been identified as a business process with a potential for automation. Therefore, there is a need for a technical solution that will determine and match the contact reason, i.e., the reason that drove an agent to conduct the business process, i.e., desktop actions, during the operation of the routine or task and the title describing the scope of these desktop actions, in an unsupervised and unlabeled manner.

SUMMARY

There is thus provided, in accordance with some embodiments of the present disclosure, a computerized-method for identifying a contact reason of a business process that has been discovered by a desktop analytics tool.

In accordance with some embodiments of the present disclosure, the computerized-method may include: (i) monitoring each interaction between an agent and a customer in a contact center to: a. generate a related interaction-transcription of the interaction and store the related interaction-transcription by an analytics Application Programming Interface (API); and b. collect and store a sequence of user desktop actions which were operated via an application or across applications during the interaction by the agent to carry out the business process; (ii) operating the desktop analytics tool to find a repetitive sequence of user desktop actions which were operated via the application or across the applications during the interaction; and to determine the repetitive sequence of user desktop actions as a discovered-routine for automation of the business process. Each sequence of the repetitive sequence of user desktop actions is stored as an instance of the discovered-routine in a routines-datastore by the desktop analytics tool, with an associated, agent-id, start-timestamp, and end-timestamp; (iii) retrieving a random sample of a preconfigured number of instances of the discovered-routine from the routines-datastore; (iv) for each instance in the random sample of the preconfigured number of instances matching a related transcript-segment; (v) identifying a contact reason of each instance by operating a first Generative (GEN) Artificial intelligence (AI) with Large Language model (LLM) with a first prompt-text including an embedded related transcript-segment. The first GEN AI with LLM has been trained to provide the contact reason based on the transcript-segment which is embedded in the first prompt-text; and (vi) identifying the contact reason of the discovered-routine as the contact reason of the business process by operating a second GEN AI with LLM with a second prompt-text for aggregation of all the contact reasons of all instances in the random sample. The second GEN AI with LLM has been trained to provide a contact reason based on the contact reasons of all instances which are embedded in the second prompt-text.

Furthermore, in accordance with some embodiments of the present disclosure, the matching of the related transcript-segment may include: a. retrieving the agent-id, start-timestamp, and end-timestamp that are associated to the instance, from the routines-datastore; b. retrieving an interaction-id that is associated to the instance based on the retrieved agent-id, start-timestamp, and end-timestamp from an interactions API; c. retrieving a related interaction-transcription based on the retrieved interaction-id, from the analytics API;

and d. extracting from the related interaction-transcription the transcript-segment based on the instance associated, start-timestamp, and end-timestamp.

Furthermore, in accordance with some embodiments of the present disclosure, the extracting of the transcript-segment from the related interaction-transcription, may include: (i) calculating a segment-start-time of the transcript-segment by decreasing a first-preconfigured amount of time from the start-timestamp of the instance to yield interaction-transcript start-timestamp; (ii) determining a first-line-text in the interaction-transcription as a start-line of the transcript-segment based on the yielded interaction-transcript start-timestamp; (iii) calculating a segment-end-time of the transcript-segment by increasing a second-preconfigured amount of time from the end-timestamp of the instance to yield interaction-transcript end-timestamp; (iv) determining a second-line-text in the interaction-transcription as an end-line of the transcript-segment based on the yielded interaction-transcript end-timestamp; and (v) extracting the transcript-segment from the interaction-transcript based on the first-line-text and the second-line-text. The transcript-segment may be extracted from the related interaction-transcription between the first-line-text up until the second-line-text which ends the segment transcription and inclusive first-line-text and last lines, e.g., second-line-text. The interaction-transcription is labeled with a start-timestamp and end-timestamp related to the interaction per each line-text of the interaction-transcription.

Furthermore, in accordance with some embodiments of the present disclosure, the computerized-method may further include: (i) identifying an instance-title of each instance by operating a third GEN AI LLM with a third prompt-text including an embedded related transcript-segment. The third GEN AI with LLM has been trained to provide the instance-title based on the transcript-segment which is embedded in the third prompt-text. The identified instance-title includes up to a preconfigured number of words; and (ii) identifying a title of the discovered-routine as the title of the business process by operating a fourth GEN AI with LLM with a fourth prompt-text for aggregation of all the instance-titles of all instances in the random sample. The fourth GEN AI with LLM has been trained to provide the title based on the instance-titles of all instances which are embedded in the fourth prompt-text.

Furthermore, in accordance with some embodiments of the present disclosure, the identified contact reason of the discovered-routine may be stored in a business-processes database with an associated generated automated routine.

Furthermore, in accordance with some embodiments of the present disclosure, the computerized-method may further include generating the automated routine by: (i) translating the user desktop actions operated via an application or across applications to carry out the business process to a set of corresponding objects in a automation tool; and (ii) compiling the objects to a code that includes a set of instructions to be executed at runtime as a dynamic linked library in a desktop environment that allows communications with one or more applications.

Furthermore, in accordance with some embodiments of the present disclosure, the computerized-method may further include for each new inbound-interaction: (i) identifying the contact reason by operating the first GEN AI with LLM with the first prompt-text including an embedded transcript of the new inbound-interaction; and (ii) triggering the stored generated automated routine that is associated to the identified contact reason. The triggering of the stored generated automated routine comprising executing the code of the associated generated automated routine at runtime as the dynamic linked library in the desktop environment that allows communication with one or more applications.

Furthermore, in accordance with some embodiments of the present disclosure, the first GEN AI with LLM and the second GEN AI with LLM may be trained by an open-source LLM with a first labeled dataset of transcripts, each transcript in the first labeled dataset of transcripts is labeled with a call reason.

Furthermore, in accordance with some embodiments of the present disclosure, the third GEN AI with LLM and the fourth GEN AI with LLM may be trained by the open-source LLM with a second labeled dataset of transcripts each transcript in the second labeled dataset of transcripts is labeled with a title.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 1A schematically illustrates a high-level diagram of a desktop analytics tool to find a repetitive sequence of user desktop actions which were operated via the application or across the applications during the interaction;

FIGS. 2A-2C schematically illustrates a high-level diagram of a computerized-method for identifying a contact reason of a business process that has been discovered by a desktop analytics tool, in accordance with some embodiments of the present invention;

FIG. 11C is a screenshot of a UI that is associated to the desktop analytics tool showing the UI after pasting data and typing text on screen "Contact book", in accordance with some embodiments of the present invention; and FIG. 12 is an example of a transcription, in accordance with some embodiments of the present invention.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

FIG. 1A schematically illustrates a high-level diagram of a desktop analytics tool to find a repetitive sequence of user desktop actions which were operated via the application or across the applications during the interaction.

Figure 10:
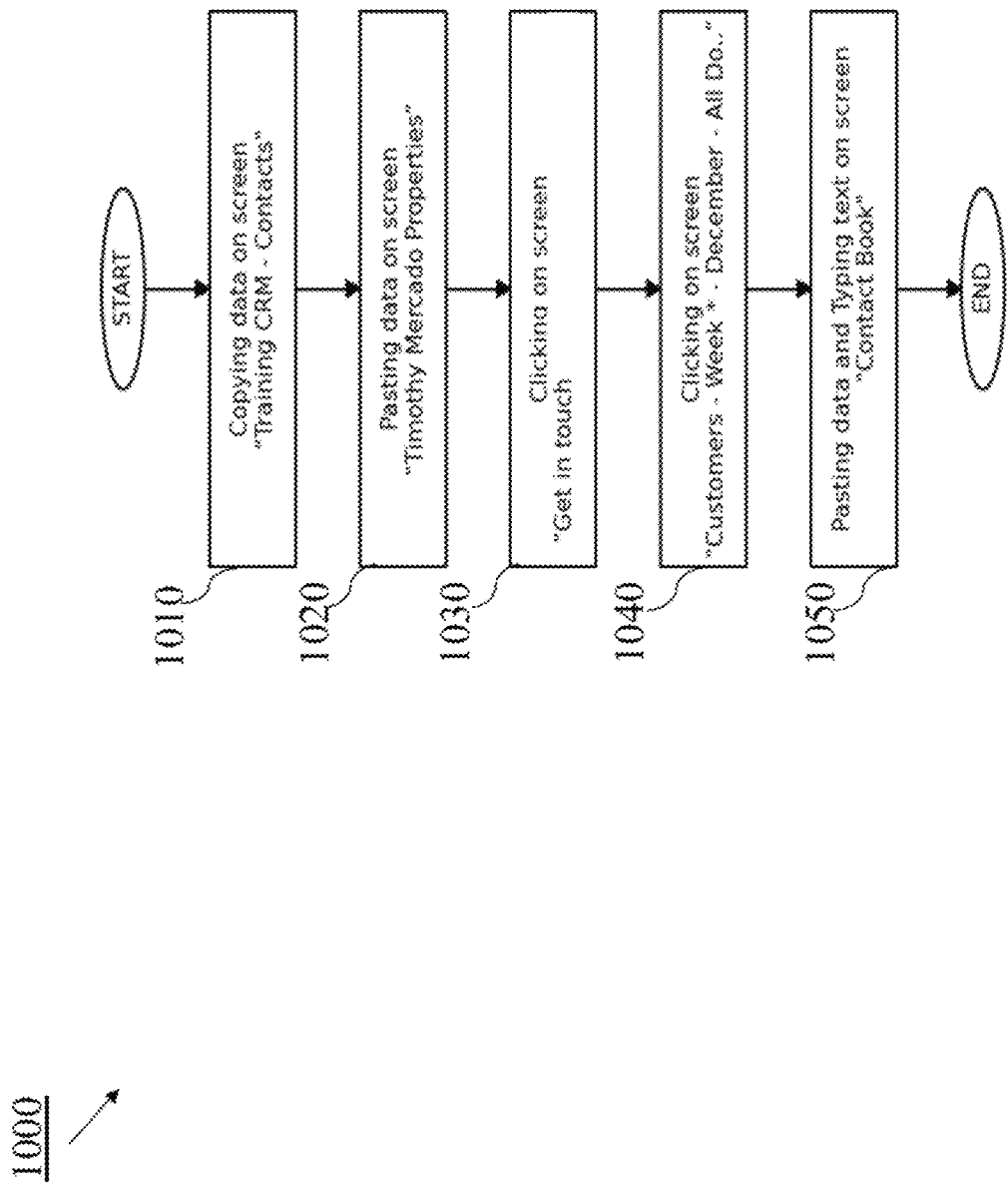
FIG. 10 schematically illustrates a high-level diagram of a sequence of user desktop actions which were operated via an application or across applications during the interaction by the agent to carry out the business process, in accordance with some embodiments of the present invention.

Any desktop analytics tool collects millions of user actions to uncover productivity gaps and surface processes inefficiencies. This unprecedented visibility allows organizations to optimize their contact center operations and achieve substantial cost savings. Businesses and organizations often struggle to harness the true potential of this data. To maximize value that organizations can yield from collected real-time desktop data, e.g., a repetitive sequence of user desktop actions which were operated via the application or across the applications during an interaction, there is a need for a technical solution that will provide insights into the business processes, as shown in FIG. 10.

In contact centers, agents are tasked with performing a multitude of repetitive actions, e.g., repetitive sequence of user desktop actions which were operated via the application or across the applications during the interaction, commonly referred to as routines.

The data is being collected from the users' actions, e.g., a user desktop actions which were operated via the application or across the applications during the interaction, 110a-110c and passed via a Real-Time (RT) server 115a and data exporter to an Automation Finder (AF) server 120a where it is stored. The data may be forwarded, for example, in JavaScript Object Notation (JSON) file format over Hypertext Transfer Protocol Secure (HTTPS) connection. The discovery of a business process, e.g., routine, takes place within the AF server 120a once it is invoked from an AF portal 125a by a business analyst. The discovery results, e.g., one or more repetitive sequences of user desktop actions, which were operated via the application or across the applications during the interaction, are stored in the AF server 120a and displayed via the AF portal 125a.

Repetitive routine instances are discovered and stored in the AF server 120a. Each instance is associated with an agent ID and start and end timestamps. The discovery of routines and storage may be implemented, for example, as described in U.S. Pat. Nos. 11,562,311 B2, 11,270,241 B2 and US Patent publication 2023/0359659 A1.

One of the main building-blocks of automation life cycle is identifying business processes within the enterprise that are significant candidates for automation, i.e., feasible for automation and have high potential Return On Investment (ROI) by saving significant manual efforts and workloads when being handled by robots instead of human agents.

In current technical solutions, this discovery and analysis process is made manually and is far from being optimal due to several reasons. First, the identified flows may be difficult to justify. Second, other, more significant, flows can be easily missed and third, the discovery process is biased, time consuming and very expensive.

A significant challenge for the analyst that is identifying business processes that are significant candidates for automation, lays in comprehending the true scope, e.g., title and purpose, e.g., contact reason, of each business process, i.e., routine. This lack of clarity hampers the ability to provide suggestions to the analyst as to how to improve performance and create valuable automations. Among the many routines agents perform, only a few are easily understood by analysts. There is a lack of methods or processes to comprehend why agents engage in specific series of activities, e.g., repetitive sequence of user desktop actions which were operated via the application or across the applications during the interaction.

Current technical solutions, collect and analyze data based on images, and not on the more technically challenging data collection based on application and application-fields context and the accompanying agent-customer transcription.

There are also current process mining tools which attempt to identify potential automation based on system event logs. This is tackling the problem from a different angle because data is gathered from log events of enterprise applications which is a lengthy process, that requires cooperation of the organization, and not all existing apps have such logs that can be used, hence there may be lack of complete data. The analysis is on the level of step-in-business-process but doesn't consider the actual actions the user has to take in order to complete a specific step in a process, i.e., disconnection between steps in a flow to what can be automated. Also, the data is labeled by definition, i.e., label exists in the data gathered from the event logs.

Therefore, there is a need for a system and method that will identify a contact reason of a business process that has been discovered by a desktop analytics tool.

Figure 1B:
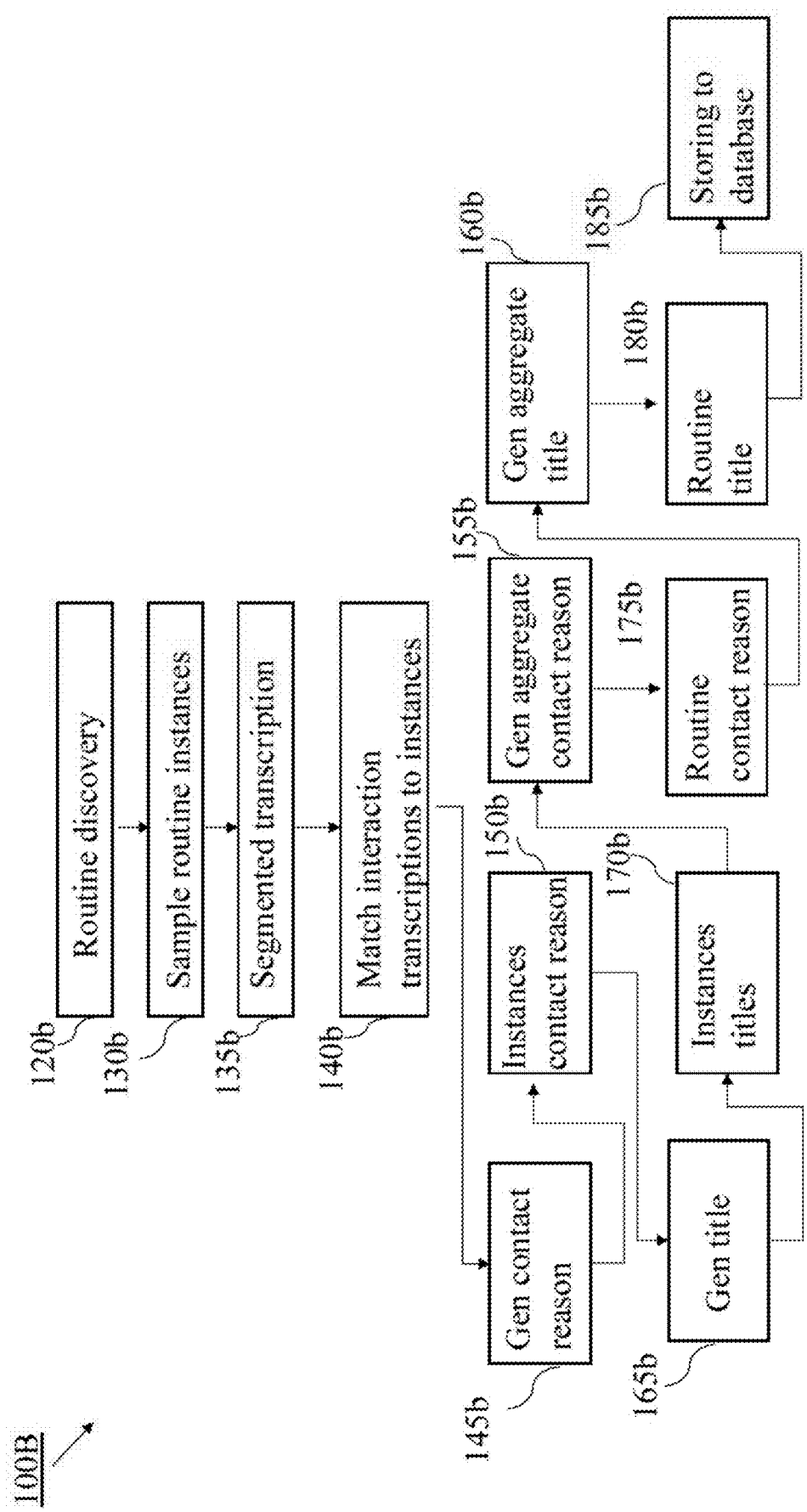
FIG. 1B schematically illustrate a high-level diagram of a computerized-method for identifying a contact reason of a business process that has been discovered by a desktop analytics tool, in accordance with some embodiments of the present invention.

FIG. 1B schematically illustrate a high-level diagram of a computerized system 100B for identifying a contact reason of a business process that has been discovered by a desktop analytics tool, in accordance with some embodiments of the present invention.

According to some embodiments of the present disclosure, a system, such as system 100B may generate business processes with an associate intent, e.g., contact reason in a completely unsupervised and unlabeled manner. It is adapted to a variety of agent-customer interactions natural language conversation describing the contact reason, that is preceding actionable business processes which are performed by contact center agents and a title that reflects the agent activity scope. The contact reason describes the reason for the interaction from the text of the interaction-transcription.

According to some embodiments of the present disclosure, the title may be a short summary of the whole interaction-transcription and accompanying the desktop routine, e.g., the discovered-routine while it is being performed. It describes the whole scope of the text of the interaction-transcription. The title is an additional text description of the discovered-routine that may help a user, such as an analyst understand along with some more details, what is the context of the interaction for the specific discovered-routine.

Figure 2B:
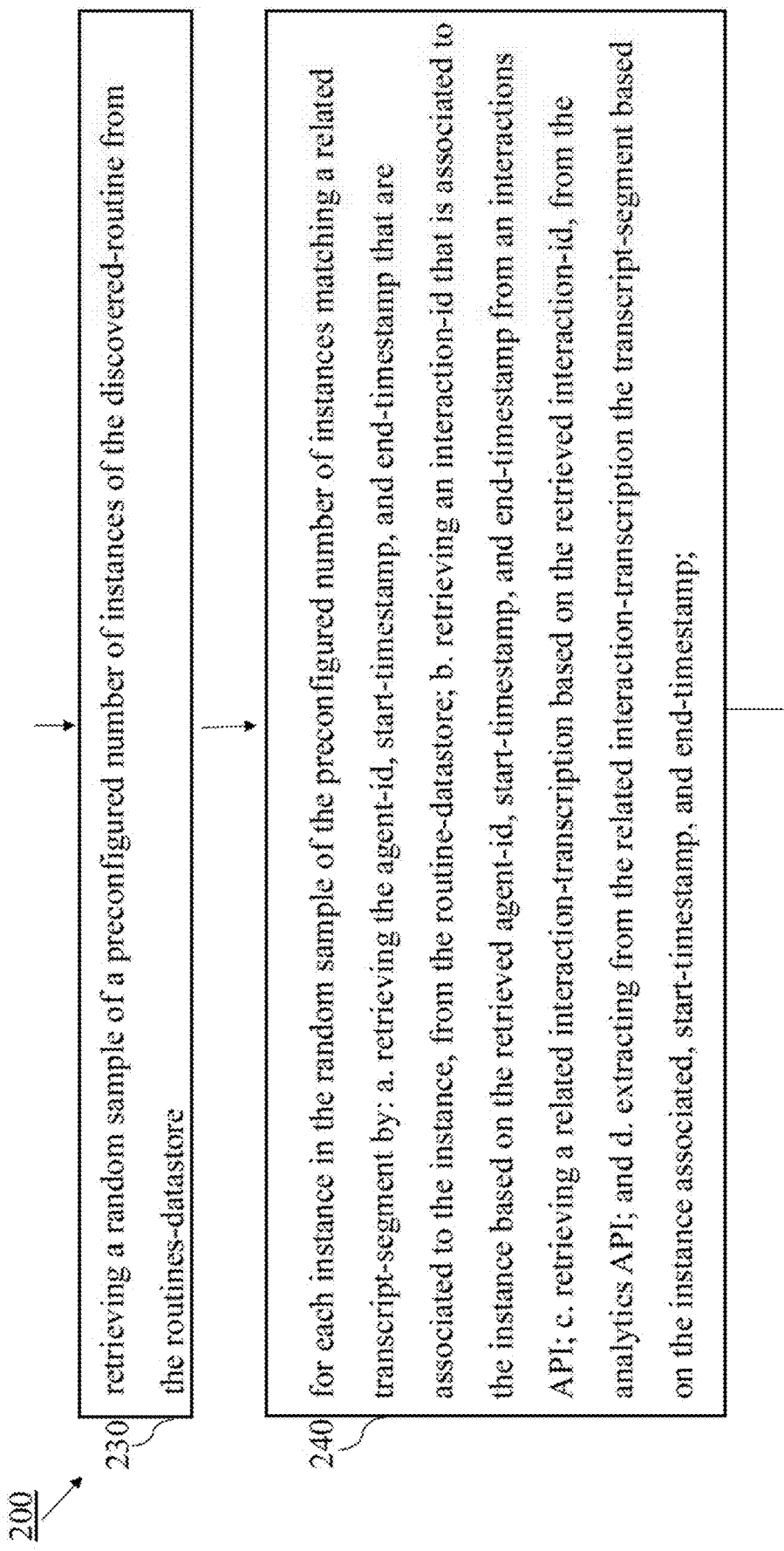
Figure 2C:
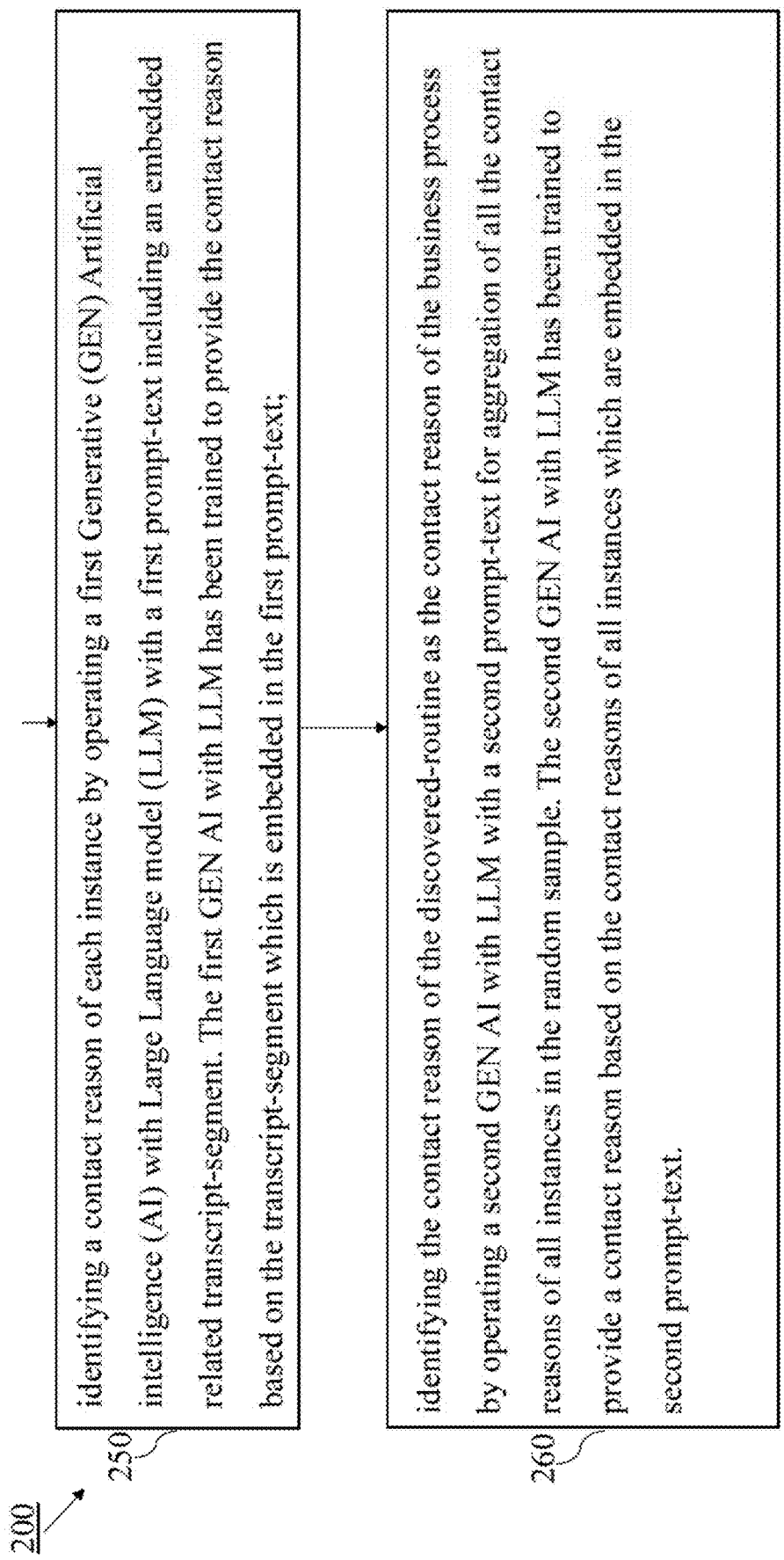

According to some embodiments of the present disclosure, system 100B may discover and match the contact reason that drove the agents to conduct a repetitive sequence of user desktop actions and the title describing the scope of the activity during the interaction by implementing a method, such as computerized-method 200 in FIGS. 2A-2C for identifying a contact reason of a business process that has been discovered by a desktop analytics tool. The repetitive sequence of user desktop actions, for example as shown in FIG. 10, may be a routine that has been discovered by a desktop analytics tool for automation.

According to some embodiments of the present disclosure, system 100B may utilize generative completion and generative aggregation capabilities of a GEN AI with LLM, where interaction transcriptions are provided as input. The adequate time segment and transcription of the interaction may be correlated with instances of a repetitive agent desktop routine.

According to some embodiments of the present disclosure, a routine discovery 120b, such as AF server 120a in FIG. 1A, may be operated. The desktop analytics tool, such as routine discovery 120b, may be operated to find a repetitive sequence of user desktop actions, which were operated via the application or across the applications during the interaction and to determine the repetitive sequence of user desktop actions as a discovered-routine for automation of the business process. The repetitive sequence of user desktop actions may be for example, as shown in FIG. 10.

According to some embodiments of the present disclosure, each interaction between an agent and a customer in a contact center may be monitored to generate a related interaction-transcription of the interaction, for example, as shown in FIG. 12. The generated interaction-transcription may be stored by an analytics Application Programming Interface (API). Furthermore, the interaction is monitored to collect and store a sequence of user desktop actions in real-time which are operated via an application or across applications during the interaction by the agent to carry out the business process, for example, by a system, such as system 100a in FIG. 1A. The related interaction-transcription of the interaction may be generated at the beginning of the interaction and may be continuously updated throughout the course of the interaction.

According to some embodiments of the present disclosure, each sequence of the repetitive sequence of user desktop actions is stored as an instance, e.g., routine instance in a routines-datastore by the desktop analytics tool, with an associated, agent-id, start-timestamp, and end-timestamp.

According to some embodiments of the present disclosure, a sample of routine instances 130b, e.g., a random sample of a preconfigured number of instances of the discovered-routine, may be retrieved from the routines-datastore.

According to some embodiments of the present disclosure, a segmented transcription 135b of an interaction that is related to an instance may be created by extracting a transcript-segment from the related interaction-transcription. The segmented transcription may include a portion of the interaction that preceded the routine, a portion of the interaction during the routine and a portion thereafter, for example, as shown in FIG. 3C.

According to some embodiments of the present disclosure, the extraction of the transcript-segment that is related to an instance of the routine may be operated by determining a first-line-text as a start of the transcript-segment and a second-line-text as the end of the transcript-segment. The transcript-segment may be extracted from the related interaction-transcription between the first-line-text up until the second-line-text which ends the segment transcription and inclusive first-line-text and last lines, e.g., second-line-text. The first-line-text in the interaction-transcription may be determined as a start-line of the segment based on a calculated interaction-transcript start-timestamp which may be calculated by decreasing a first-preconfigured amount of time from the start-timestamp of the instance. The second-line-text in the interaction-transcription may be determined as an end-line of the segment based on a calculated interaction-transcript end-timestamp. The interaction-transcript end-timestamp may be calculated by increasing a second-preconfigured amount of time from the end-timestamp of the instance.

According to some embodiments of the present disclosure, matching interaction transcriptions to instances 140b may be operated by matching for each instance in the random sample of the preconfigured number of instances a related transcript-segment. The matching may be operated by retrieving the agent-id, start-timestamp, and end-timestamp that are associated to the instance, from the routines-datastore and retrieving an interaction-id that is associated to the instance based on the retrieved agent-id, start-timestamp, and end-timestamp from an interactions API. Then, retrieving a related interaction-transcription based on the retrieved interaction-id, from the analytics API and extracting from the related interaction-transcription the transcript-segment based on the instance associated, start-timestamp, and end-timestamp.

According to some embodiments of the present disclosure, the interaction-transcription may be labeled with a start-timestamp and end-timestamp per each line-text of the interaction-transcription.

According to some embodiments of the present disclosure, an AI server may operate a Gen contact reason 145b to identify a contact reason of each instance. The identifying of contact reason of each instance may be operated by a first Generative (GEN) Artificial intelligence (AI) with Large Language model (LLM) with a first prompt-text including an embedded related transcript-segment. The first GEN AI with LLM has been trained to provide the contact reason based on the transcript-segment which is embedded in the first prompt-text. The first GEN AI with LLM may provide contact reason for each instance in the random sample of a preconfigured number of instances of the discovered-routine 150b.

According to some embodiments of the present disclosure, Gen aggregate contact reason 155b may be operated to identify the contact reason of the discovered-routine as the contact reason of the business process. Routine contact reason 175b, i.e., the contact reason of the business process, may be identified by operating a second GEN AI with LLM with a second prompt-text for aggregation of all the contact reasons of all instances in the random sample. The second GEN AI with LLM has been trained to provide a contact reason based on the contact reasons of all instances which are embedded in the second prompt-text.

According to some embodiments of the present disclosure, the AI server may further operate a Gen title 165b to identify an instance-title to each instance 170b. The instance-title of each instance may be identified by operating a third GEN AI LLM with a third prompt-text including an embedded related transcript-segment. The third GEN AI with LLM has been trained to provide the instance-title based on the transcript-segment which is embedded in the third prompt-text. The identified title may include up to a preconfigured number of words.

According to some embodiments of the present disclosure, routine title 180b may be identified as the title of the discovered-routine, e.g., the business process, by operating a fourth GEN AI with LLM with a fourth prompt-text for aggregation of all the instance-titles of all instances in the random sample. The fourth GEN AI with LLM has been trained to provide the title based on the instance-titles of all instances which are embedded in the fourth prompt-text.

According to some embodiments of the present disclosure, the identified contact reason of the discovered-routine and the title may be stored in a business-processes database with an associated generated automated routine 185b.

According to some embodiments of the present disclosure, the automated routine may be generated by translating the user desktop actions operated via an application or across applications to carry out the business process to a set of corresponding objects in an automation tool and then compiling the objects to a code that includes a set of instructions to be executed at runtime as a dynamic linked library in a desktop environment that allows communications with one or more applications.

According to some embodiments of the present disclosure, once the routine is identified by an analysis of a portion of a new coming interaction, system 100B may further analyze a portion of an interaction that precedes the start of a routine for each agent, that occurred via various communication channels, such as calls or chats and then implement an automation of the routine by an RPA bot. Ongoing transcript segment portions of new inbound-interactions may be sent continuously and used by the first GEN AI with LLM to deduce a resultant contact reason that has been identified by system 100B from the transcript segment. Then, the result contact reason may be compared to a list of stored and identified contact reasons of the discovered-routines that was stored in a business-processes database. When there is a match, then the associated discovered automated routine of the contact reason may be executed instead of the agent.

According to some embodiments of the present disclosure, system 100B may assign text attributes of intent, e.g., contact reason and additional interaction topics to each routine instance, with a focus on the beginning of the transcription which allows to assign each routine a real scope, e.g., title, thus, making it more than just a collection of data points. The contact reason and title may describe the scope of each routine, e.g., identified business process. The contact reason and title may be reviewed and the probability of different scopes for the routines may be assessed.

According to some embodiments of the present disclosure, by integrating with interactions text transcription capabilities and generating intent from the GEN AI LLM, a contact reason may be mapped to the business process from all agents' interactions which are associated with this business process.

According to some embodiments of the present disclosure, for each new inbound-interaction in the contact center the contact reason of the inbound-interaction may be identified and then the stored generated automated routine that is associated to the identified contact reason may be triggered. The contact reason of the new inbound-interaction may be identified by operating the first GEN AI with LLM with the first prompt-text including an embedded transcript of the new inbound-interaction.

According to some embodiments of the present disclosure, a new inbound-interaction transcription may be continuously analyzed using first GEN AI with LLM that generates contact reasons. This is an iterative process that generates contact reasons every several seconds, based on portions of the new interaction. Once a new generated contact reason matches a stored routine's contact reason, the agent is offered to trigger the automated routine by executing the code of the associated generated automated routine at runtime as the dynamic linked library in the desktop environment that allows communication with one or more applications.

According to some embodiments of the present disclosure, the stored automated routine that is associated to the identified contact reason may be triggered by executing the code of the associated generated automated routine at runtime as the dynamic linked library in the desktop environment that allows communication with one or more applications, when the contact reason that is associated to the automated routine is identified in a portion of a transcript of the new inbound-interaction.

According to some embodiments of the present disclosure, the first GEN AI with LLM and the second GEN AI with LLM may be trained by an open-source LLM with a first labeled dataset of transcripts, e.g., interaction-transcription. Each transcript in the first labeled dataset of transcripts may be labeled with a call reason, e.g., contact reason.

According to some embodiments of the present disclosure, the third GEN AI with LLM and the fourth GEN AI with LLM may be trained by the open-source LLM with a second labeled dataset of transcripts, e.g., interaction-transcription. Each transcript in the second labeled dataset of transcripts is labeled with a title.

According to some embodiments of the present disclosure, in another example, the following prompt may be provided to the GEN AI with LLM:

"Summarize the titles based on the following [Debit card not working, Debit card not working, Debit card not working, Deactivate debit card, Debit card not working, Debit card not working, Deactivate debit car, Debit card not working, Deactivate debit card], into one phrase while using only the majority from the list" and the output of the GEN AI with LLM may be "Debit card not working, deactivate request."

According to some embodiments of the present disclosure, a golden dataset, i.e., clean, validated, and integrated dataset, was used for evaluation of the routines, as shown in FIGS. 11-12. Using the evaluated dataset which has been manually tagged, the aggregated metrics for routine contact reason and title, achieved 90% precision and 80% recall. A known metric for text summarization was used. Specifically, the metrics were computed using ROUGE-1 metric for precision and recall, which measures the number of matching words between the model-generated text and the human-produced tagged reference.

FIGS. 2A-2C schematically illustrates a high-level diagram of a computerized-method 200 for identifying a contact reason of a business process that has been discovered by a desktop analytics tool, in accordance with some embodiments of the present invention.

According to some embodiments of the present disclosure, operation 210 comprising monitoring each interaction between an agent and a customer in a contact center to: a. generate a related interaction-transcription of the interaction and store the related interaction-transcription by an analytics Application Programming Inter (API); and b. collect and store a sequence of user desktop actions which were operated via an application or across applications during the interaction by the agent to carry out the business process.

According to some embodiments of the present disclosure, operation 220 comprising operating the desktop analytics tool to find a repetitive sequence of user desktop actions which were operated via the application or across the applications during the interaction; and to determine the repetitive sequence of user desktop actions as a discovered-routine for automation of the business process. Each sequence of the repetitive sequence of user desktop actions is stored as an instance of the discovered-routine in a routines-datastore by the desktop analytics tool, with an associated, agent-id, start-timestamp, and end-timestamp.

According to some embodiments of the present disclosure, operation 230 comprising retrieving a random sample of a preconfigured number of instances of the discovered-routine from the routines-datastore.

According to some embodiments of the present disclosure, operation 240 comprising for each instance in the random sample of the preconfigured number of instances matching a related transcript-segment by: a. retrieving the agent-id, start-timestamp, and end-timestamp that are associated to the instance, from the routines-datastore; b. retrieving an interaction-id that is associated to the instance based on the retrieved agent-id, start-timestamp, and end-timestamp from an interactions API; c. retrieving a related interaction-transcription based on the retrieved interaction-id, from the analytics API; and d. extracting from the related interaction-transcription the transcript-segment based on the instance associated, start-timestamp, and end-timestamp.

According to some embodiments of the present disclosure, operation 250 comprising identifying a contact reason of each instance by operating a first Generative (GEN) Artificial intelligence (AI) with Large Language model (LLM) with a first prompt-text including an embedded related transcript-segment. The first GEN AI with LLM has been trained to provide the contact reason based on the transcript-segment which is embedded in the first prompt-text.

According to some embodiments of the present disclosure, operation 260 comprising identifying the contact reason of the discovered-routine as the contact reason of the business process by operating a second GEN AI with LLM with a second prompt-text for aggregation of all the contact reasons of all instances in the random sample. The second GEN AI with LLM has been trained to provide a contact reason based on the contact reasons of all instances which are embedded in the second prompt-text.

Figure 3A:
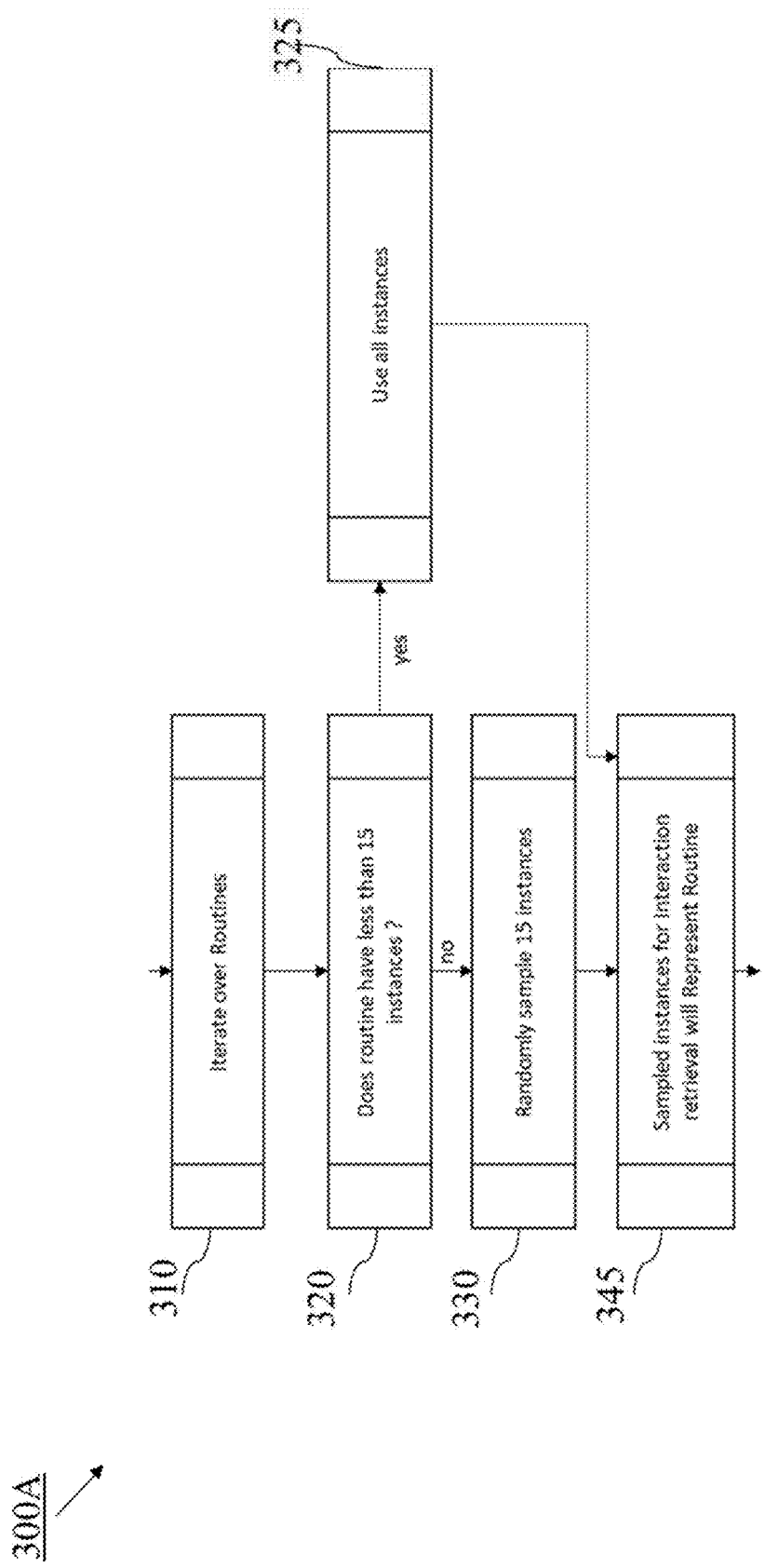
FIG. 3A schematically illustrates a high-level diagram of routine instance selection, in accordance with some embodiments of the present invention.

FIG. 3A schematically illustrates a high-level diagram of routine instance selection 300A, in accordance with some embodiments of the present invention.

According to some embodiments of the present disclosure, in a system, such as system 100B for identifying a contact reason of a business process that has been discovered by a desktop analytics tool there is a need to iterate over the routines 310 to check how many instances of the routine there are in the routines-datastore, since a routine may include hundreds and up to ten of thousands of instances, but only a few are needed to generate the contact reason and title for the routine, e.g., business process.

According to some embodiments of the present disclosure, when checking if a routine has less than a preconfigured number of instances, e.g., does routine have less than 15 instances 320, if the routine has less than the preconfigured number of instances than all the instances of the routine may be used to identify the contact reason and title, e.g., use all instances 325.

According to some embodiments of the present disclosure, if the routine doesn't have less than the preconfigured number of instances than randomly sampling a preconfigured number of instances, e.g., randomly sample 15 instances 330.

According to some embodiments of the present disclosure, random sampling of several instances of the routine may be performed using the following heuristics. The number of routine instances would be for example, a maximum 15, or all the routine instances in case there are less than 15 instances in the routine. The routine instances may be sampled randomly out of all the routine instances.

According to some embodiments of the present disclosure, the sampled instances for interaction retrieval may represent the routine 345. Then, for each instance in the random sample of the preconfigured number of instances a related transcript-segment from the related interaction may be matched. Gen AI with LLM may be used to identify the contact reason and title of the routine based on the related transcript-segment of each instance in the random sample.

Figure 3B:
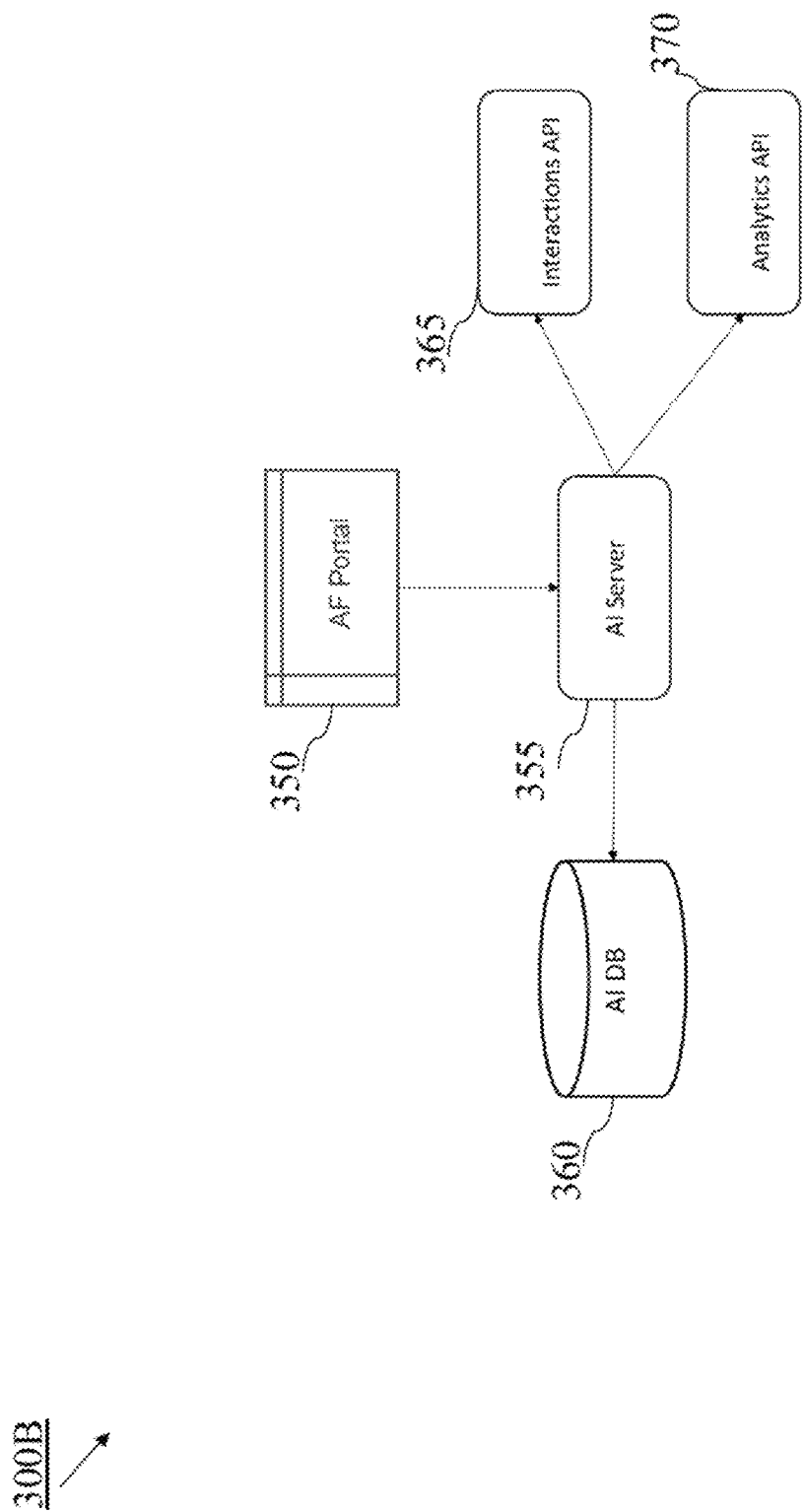
FIG. 3B schematically illustrates a high-level diagram of inclusion of retrieval of interaction ID and transcription, in accordance with some embodiments of the present invention.
Figure 3C:
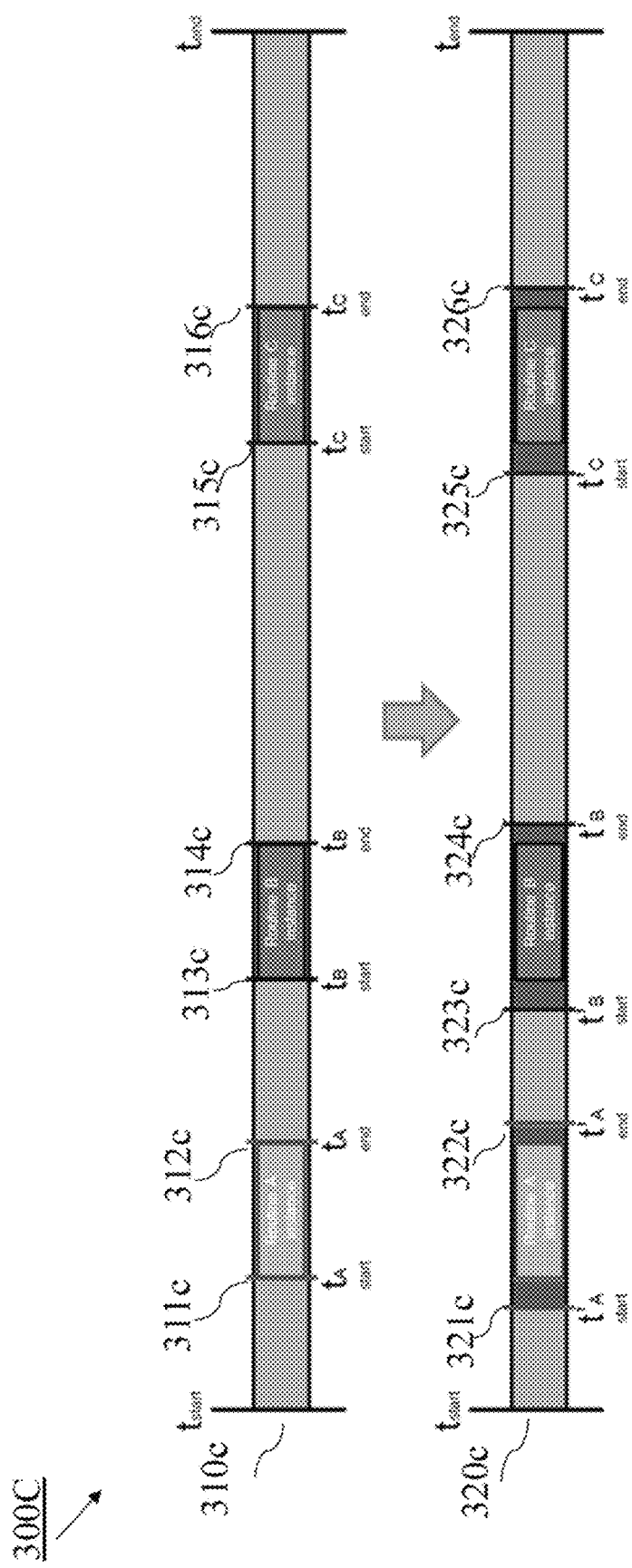
FIG. 3C schematically illustrates transcription segmentation by routine instances, in accordance with some embodiments of the present invention.

FIG. 3B schematically illustrates a high-level diagram of inclusion of retrieval of interaction ID and transcription 300B, in accordance with some embodiments of the present invention.

According to some embodiments of the present disclosure, in a system, such as system 100B in FIG. 1B, a contact reason of a business process that has been discovered by a desktop analytics tool may be identified. A random sample of a preconfigured number of instances of the discovered-routine may be retrieved from the routines-datastore. For each instance in the random sample of the preconfigured number of instances, a related transcript-segment of the related interaction, may be matched.

According to some embodiments of the present disclosure, the related transcript-segment may be matched to an instance in the random sample of instances by extracting the transcript-segment from a related interaction-transcription based on agent-id, start-timestamp, and end-timestamp that are associated to the instance. An interaction-id that is associated to the instance may be retrieved based on the agent-id, start-timestamp, and end-timestamp from an interactions API 365 and a related interaction-transcription may be retrieved based on the retrieved interaction-id, from the analytics API 370.

According to some embodiments of the present disclosure, an AI server, such as AI server 355 may be connected to an Automated Finder (AF) portal 350 for invoking and displaying the AF UI in a browser. The routine discovery may be invoked from the AF portal and takes place within the AI server 355. The discovery results may be stored in the AI server 355 and displayed in the via the AF portal 350. The AI server 355 may receive data from the interactions API 365 and from the analytics API 370.

According to some embodiments of the present disclosure, the AI server 355 may identify a contact reason of each instance by operating a first Generative (GEN) Artificial intelligence (AI) with Large Language model (LLM) with a first prompt-text including an embedded related transcript-segment. The first GEN AI with LLM has been trained to provide the contact reason based on the transcript-segment which is embedded in the first prompt-text.

According to some embodiments of the present disclosure, the AI server 355 may identify the contact reason of the discovered-routine as the contact reason of the business process by operating a second GEN AI with LLM with a second prompt-text for aggregation of all the contact reasons of all instances in the random sample. The second GEN AI with LLM has been trained to provide a contact reason based on the contact reasons of all instances which are embedded in the second prompt-text. All the text from somewhat before the start time till end time may be used to identify the contact reason.

According to some embodiments of the present disclosure, the identified contact reason of the discovered-routine may be stored with the related routine in a business-processes database, such as AI DB 360 or with an associated generated automated routine.

According to some embodiments of the present disclosure, the AI server 355 may also identify an instance-title of each instance in a random sample of a preconfigured number of instances of the discovered-routine that has been retrieved from the routines-datastore, by operating a third GEN AI LLM with a third prompt-text including an embedded related transcript-segment. The third GEN AI with LLM has been trained to provide the instance-title based on the transcript-segment which is embedded in the third prompt-text. The identified instance-title includes up to a preconfigured number of words.

According to some embodiments of the present disclosure, the AI server 355 may identify a title of the discovered-routine as the title of the business process by operating a fourth GEN AI with LLM with a fourth prompt-text for aggregation of all instance-titles of all instances in the random sample. The fourth GEN AI with LLM has been trained to provide the title based on the instance-titles of all instances which are embedded in the fourth prompt-text.

FIG. 3C schematically illustrates transcription segmentation by routine instances 300C, in accordance with some embodiments of the present invention.

According to some embodiments of the present disclosure, a transcript-segment is a subpart of a transcript of an interaction, such as the segment between start-timestamp 321c and end-timestamp 322c, the segment between start-timestamp 323c and end-timestamp 324c and the segment between start-timestamp 325c and end-timestamp 326c.

According to some embodiments of the present disclosure, to extract the transcript-segment from a full interaction transcription, for example, interaction transcription 310c, the interaction transcription may be retrieved which includes the timeframe in which the routine instance has occurred. For example, routine A instance has occurred between start-timestamp 311c and end-timestamp 312c, routine B instance has occurred between start-timestamp 313c and end-timestamp 314c and routine C instance has occurred between start-timestamp 315c and end-timestamp 316c. A related transcript-segment may be matched to each routine instance.

According to some embodiments of the present disclosure, the related transcript-segment may be matched for each interaction-transcription that is associated to an instance in the random sample of preconfigured number of instances, and that has been retrieved from the analytics API. For example, the transcript-segment of routine A may be extracted by using the routine A start-timestamp 311c and end end-timestamp 312c attributes.

According to some embodiments of the present disclosure, the text transcription of the interaction, for example as shown in FIG. 12, may be labeled with timestamps per line-text; thus, the text may be segmented for example, by taking the matching routine instance start-timestamp 311c and end-timestamp 312c of routine A and matching routine instance start-timestamp 313c and end-timestamp 314c of routine B and matching routine instance start-timestamp 315c and end-timestamp 316c of routine C.

According to some embodiments of the present disclosure, the related transcript-segment may be matched to a routine instance by initially calculating a segment-start-time and segment-end-time of the transcript-segment. The segment-start-time may be calculated by decreasing a first-preconfigured amount of time from the start-timestamp of the instance to yield interaction-transcript start-timestamp. The segment-end-time of the transcript-segment may be calculated by increasing a second-preconfigured amount of time from the end-timestamp of the instance to yield interaction-transcript end-timestamp.

According to some embodiments of the present disclosure, based on the interaction-transcript start-timestamp and an interaction-transcript end-timestamp, a start-line and end-line of the transcript-segment may be determined. The transcript-segment may be extracted from the interaction-transcript based on the determined start-line and end-line of the transcript-segment. For example, the transcript-segment related to an instance of routine A may be between a first-line-text in the interaction-transcription, as a start-line of the transcript-segment 321c and a second-line-text in the interaction-transcription as an end-line of the transcript-segment 322c. The interaction-transcription 310c may be labeled with a start-timestamp and end-timestamp related to the interaction per each line-text of the interaction-transcription 310c.

According to some embodiments of the present disclosure, for example, the instance start time $t'_{start}$ may be decreased, e.g., by 5 seconds, to include text from the interactions-transcription that preceded the routine, e.g., repetitive sequence of user desktop actions which were operated via the application or across the applications during the interaction and has been determined as a discovered-routine for automation of a business process.

According to some embodiments of the present disclosure, the purpose of the inclusion of the text from the interaction-transcription, before the start time of the routine, is to provide more information as to the identified contact reason and title. Additionally, the text in the interaction-transcription before the start time of the routine may be used to identify the contact reason in a new interaction by the GEN AI with LLM, once the routine is automated and stored in a business-processes database with an associated contact reason and then based on the identified contact reason based on the interaction-transcription of the new interaction, the associated automated routine may be triggered.

According to some embodiments of the present disclosure, the first line of the interaction-transcription with a timestamp smaller than $t'_{start}$ 321c may be where the transcript-segment cut-off starts, while scanning backward from $t'_{start}$ 311c. The instance end time $t'_{end}$ 312c may be increased, e.g., by 2 seconds, to include text that commonly surpasses the agent actions time for executing the business process in the agent desktop environment. The first line of interaction-transcription with a timestamp larger than $t'_{end}$ 322c may be where the transcript-segment cut-off stops, while scanning forward from $t'_{end}$ 322c.

Figure 4:
FIG. 4 schematically illustrates a high-level diagram of each routine instance that is mapped to a segmented transcription, in accordance with some embodiments of the present invention.

FIG. 4 schematically illustrates a high-level diagram 400 of each routine instance that is mapped to a segmented transcription, in accordance with some embodiments of the present invention.

According to some embodiments of the present disclosure, for each instance in the random sample of the preconfigured number of instances matching a related transcript-segment. To handle each routine, iterating over the routine instances 410.

According to some embodiments of the present disclosure, for each instance, iterating over routine instance transcribed text lines 420 which is the extracted transcript-segment from the related interaction-transcription based on the instance associated, start-timestamp, and end-timestamp.

According to some embodiments of the present disclosure, for each text line in the transcript-segment, checking if the text line has a timestamp that is higher than the $t'_{start}$, such as 321c in FIG. 3C, that is the segment-start-time which is the interaction-transcript start-timestamp of the transcript-segment calculated by decreasing a first-preconfigured amount of time from the start-timestamp of the instance, e.g., Does text line have timestamp >($t'_{start}$-5 seconds) 430.

According to some embodiments of the present disclosure, when the timestamp of the line text in the interaction-transcript is higher than the interaction-transcript start-timestamp of the transcript-segment, appending the text line to the segmented transcription 450.

According to some embodiments of the present disclosure, iterating over the routine instance, next transcribed text lines 460, and for each text line checking if the text line has a timestamp that is higher than the $t'_{end}$, such as 322c in FIG. 3C that is the segment-end-time which is the interaction-transcript start-timestamp of the transcript-segment calculated by increasing a second-preconfigured amount of time to the end-timestamp of the instance, e.g., Does text line have timestamp >($t'_{end}$+2 seconds) 470.

According to some embodiments of the present disclosure, when the timestamp of the line text in the interaction-transcript is not higher than the interaction-transcript end-timestamp of the transcript-segment appending the text line to the segmented transcription 480.

According to some embodiments of the present disclosure, when the timestamp of the line text in the interaction-transcript is higher than the interaction-transcript end-timestamp of the transcript-segment than the segmented text transcription 490 is extracted from the interaction-transcription.

According to some embodiments of the present disclosure, thus, by operations 420-490, each routine instance is mapped to a segmented transcription.

Figure 5A:
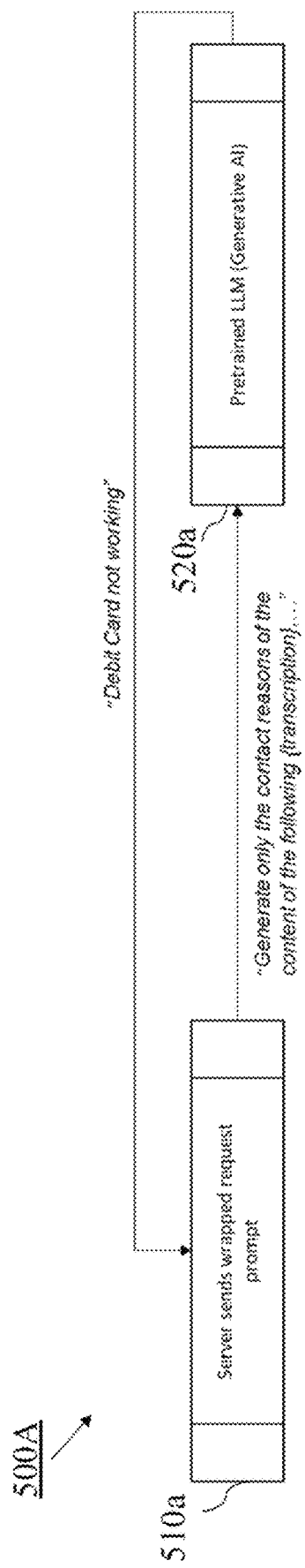
FIGS. 5A-5B schematically illustrates a high-level diagram of routine instances segments, in accordance with some embodiments of the present invention.

FIG. 5A schematically illustrates a high-level diagram 500A of routine instances segments, in accordance with some embodiments of the present invention.

According to some embodiments of the present disclosure, in a system, such as system 100B in FIG. 1B, for each routine instance in the random sample of a preconfigured number of instances of the discovered-routine that has been retrieved from the routines-datastore, a contact reason may be generated based on a segmented transcription that is related to an instance.

According to some embodiments of the present disclosure, an AI server may wrap the request with a description string outlining the required output that is required from the GEN AI with LLM and send it, e.g., server sends wrapped request prompt 510a to a pretrained GEN AI with LLM 520a. For example, the prompt request may be:

"Generate only the contact reasons of the content of the following {transcription}, if there is more than one contact reason summarize call reasons to 2 or 3 items.". The {transcription} syntax, is a placeholder where the segmented transcription that is related to the instance is placed.

Figure 5B:
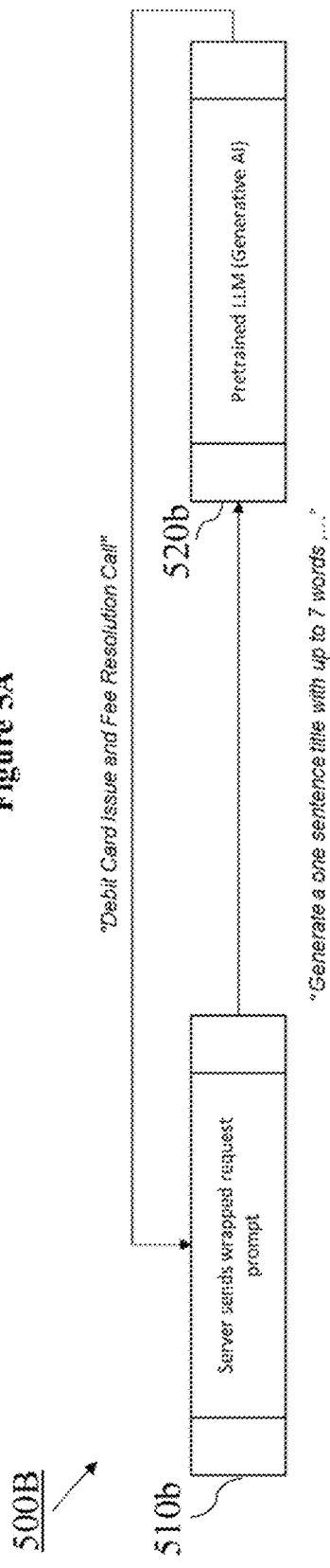

FIG. 5B schematically illustrates a high-level diagram 500B of routine instances segments, in accordance with some embodiments of the present invention.

According to some embodiments of the present disclosure, an AI server may wrap the request with a description string outlining the required output that is required from the GEN AI with LLM. And send it, e.g., server sends wrapped request prompt 510b to a pretrained GEN AI with LLM 520b.

According to some embodiments of the present disclosure, for each routine instance, the title is generated based on the segmented transcription. For example, the prompt request may be, Generate a one sentence title with up to 7 words of the content of the following {transcription}. The {transcription} syntax, is a placeholder where the segmented transcription is placed.

Figure 6:
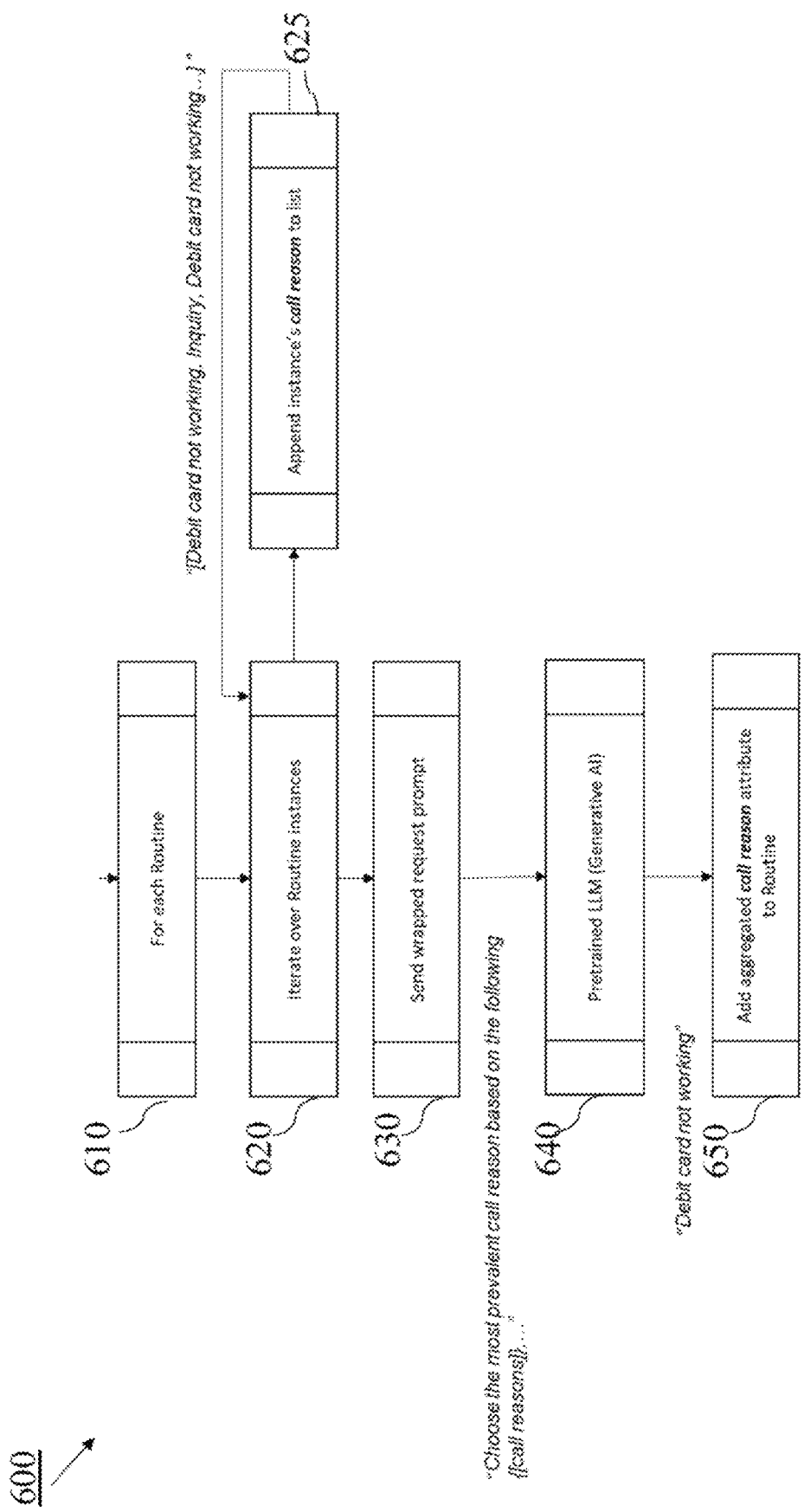
FIG. 6 schematically illustrates a high-level diagram of an aggregation of call reasons per routine, in accordance with some embodiments of the present invention.

FIG. 6 schematically illustrates a high-level diagram of an aggregation of contact reasons per routine, in accordance with some embodiments of the present invention.

According to some embodiments of the present disclosure, for each routine 610, e.g., each discovered-routine, using its sampled routine instances and using the contact reasons generated for each instance. The aggregated contact reason representing the whole routine is generated based on the aggregated list of contact reasons.

According to some embodiments of the present disclosure, the list may be aggregated by iterating over routine instances 620 and appending the instance contact reason to the list 625. The contact reason may be a call reason or a chat reason by any type of communication channel.

According to some embodiments of the present disclosure, the AI server may wrap the request with a description string outlining the required output that is required and send the wrapped request prompt 630 to obtain contact reason of the discovered-routine from a pretrained Gen AI with LLM 640. For example, the prompt request may be:

"Choose the most prevalent contact reason based on the following {[segments contact reasons]}, into one phrase while using only one reason from the majority from the list {[segments contact reasons]}" The {[segments contact reasons]} syntax, is the placeholder where the list of the generated routine instances segments call-reasons, delimited by commas. The aggregated contact reason attribute may be added to the routine 650.

According to some embodiments of the present disclosure, in a system, such as system 100B, after the second GEN AI with LLM with a second prompt-text for aggregation of all the contact reasons of all instances in the random sample may be operated, a probability distribution of the instances' generated contact reasons may be generated. The occurrence percentage out of the total for each contact reason may be computed. For example, if 7 out of 10 contact reasons where 'Debit Card not working' then, 'Debit Card not working' receives 70%. The most prevalent contact reason assigned to the routine may be appended with its associated distribution, e.g., '(70%)'. A list of the top preconfigured number, e.g., 5 contact reasons and their associated distribution probability may be passed back to be presented in the portal, such as AF portal 350 in FIG. 3B, which lists the routines and their properties.

Figure 7:
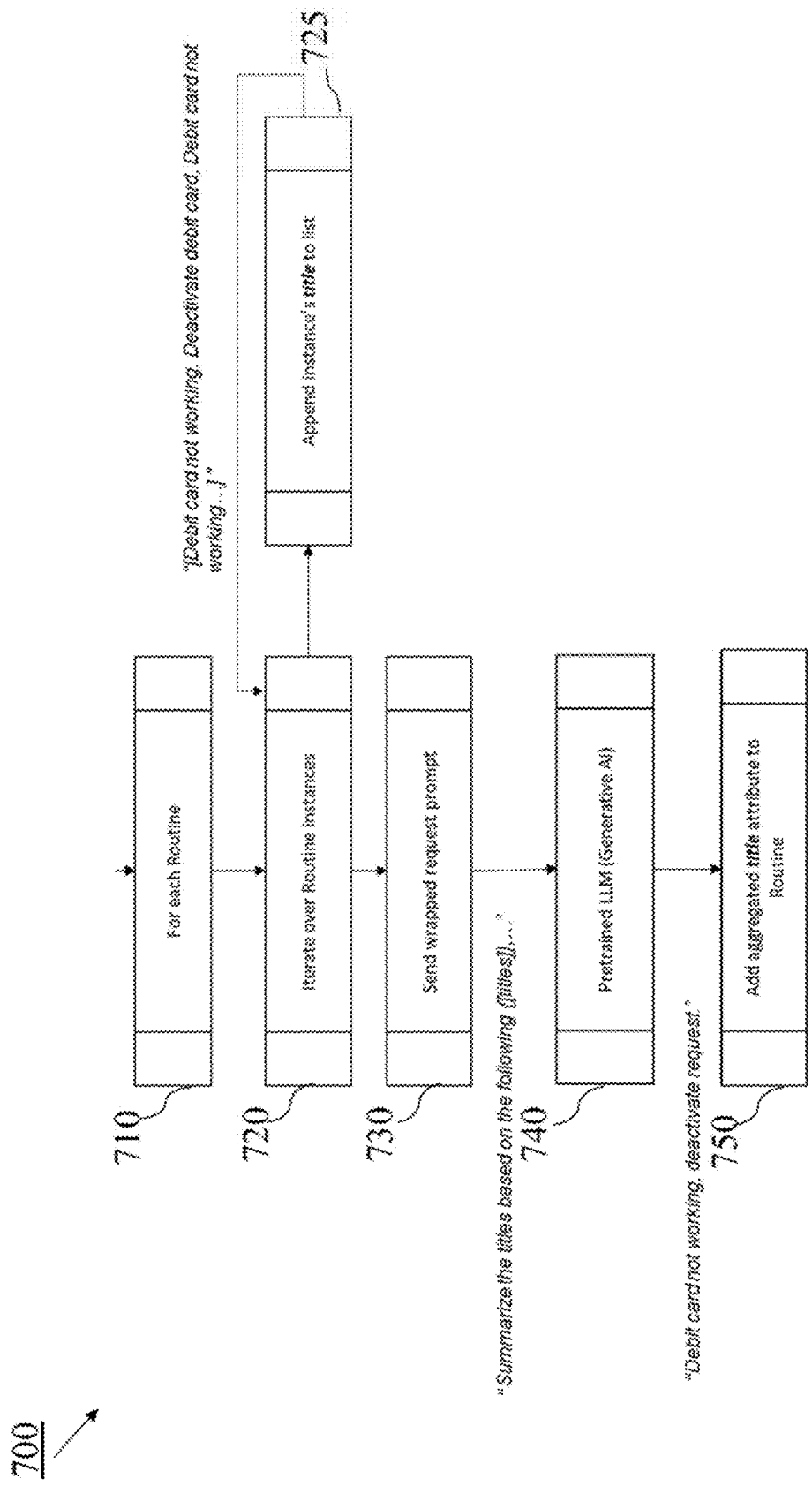
FIG. 7 schematically illustrates a high-level diagram of an aggregation of titles per routine, in accordance with some embodiments of the present invention.

FIG. 7 schematically illustrates a high-level diagram of an aggregation of titles per routine 700, in accordance with some embodiments of the present invention.

According to some embodiments of the present disclosure, for each routine 710 using its sampled routine instances and using the titles generated for each instance. The list of sampled routine instances is aggregated by iterating over routine instances 720 and appending the instance contact reason to the list 725. The aggregated title representing the whole routine is generated based on the aggregated list of contact reasons.

According to some embodiments of the present disclosure, the AI server, such as AI server 355 in FIG. 3B, may wrap the request with a description string outlining the required output that is required and send the wrapped request prompt 730 to obtain title of the discovered-routine from a pretrained Gen AI with LLM 740. For example, the prompt request may be: Summarize the titles based on the following {[segments titles]}, into one phrase while using only the majority from the list. The {[segments titles]} syntax, is the placeholder where the list of the generated routine instances segments titles, delimited by commas.

Figure 8A:
FIG. 8A is a screenshot of a User Interface (UI) that is associated to the desktop analytics tool showing results of routines enhancement, in accordance with some embodiments of the present invention.

FIG. 8A is a screenshot of a User Interface (UI) 800A that is associated to the desktop analytics tool showing results of routines enhancement, in accordance with some embodiments of the present invention.

According to some embodiments of the present disclosure, a report that is showing all the discovered-routines and the associated contact reason may be displayed via a UI such as UI 800 via the AF portal such as AF portal 350 in FIG. 3B.

According to some embodiments of the present disclosure, per each identified routine, e.g., discovered-routine, a column of contact reason may represent the aggregated contact reason with a value of the highest probability from all contact reasons discovered. E.g., "Debit card not working (70%)". In addition, a routine name column may present that identified title of the routine which is a value that represent the aggregated title of the routine from all titles discovered e.g., all instances in the sample, such as "Inquiry on card issue".

Figure 8B:
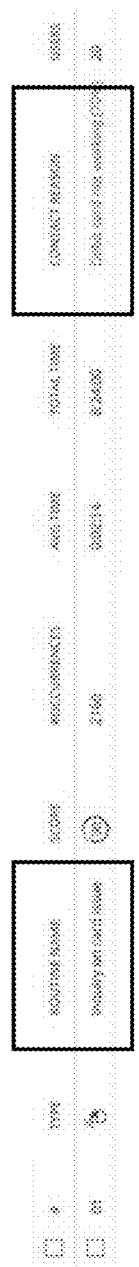
FIG. 8B is a screenshot of a UI that is associated to the desktop analytics tool showing a result from results of routines enhancement, in accordance with some embodiments of the present invention.

FIG. 8B is a screenshot of a UI 800B that is associated to the desktop analytics tool showing a result from results of routines enhancement, in accordance with some embodiments of the present invention.

According to some embodiments of the present disclosure, for example, the routine name, which is the identified title of the discovered-routine may be inquiry on card issue and the contact reason of the identified routine may be debit card no working (70%). The 70% may represent the probability of the contact reason from all instances in the random sample of instances of the discovered-routine.

Figure 9A:
FIG. 9A is a screenshot of a UI that is associated to the desktop analytics tool showing contact reason selection, in accordance with some embodiments of the present invention.

FIG. 9A is a screenshot of a UI 900A that is associated to the desktop analytics tool showing contact reason selection, in accordance with some embodiments of the present invention.

Figure 9B:
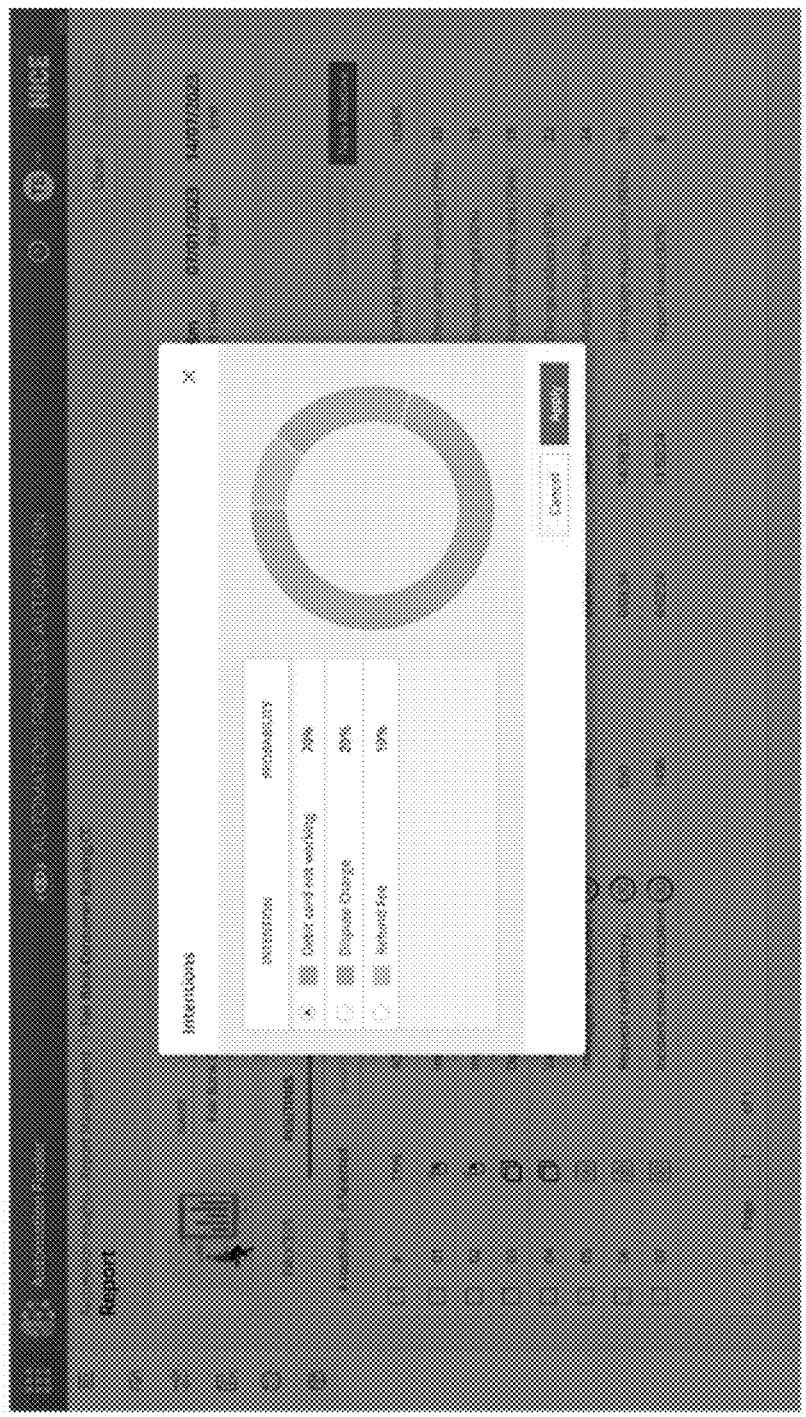
FIG. 9B is a screenshot of a UI that is associated to the desktop analytics tool showing a diagram showing all the call reasons that have been discovered, in accordance with some embodiments of the present invention.

According to some embodiments of the present disclosure, once a user clicks on a contact reason, for example: the "Debit card not working (70%)" value of the "CONTACT REASON" column in the grid a pop-up may be presented, as shown in FIG. 9B.

FIG. 9B is a screenshot of a UI 900B that is associated to the desktop analytics tool showing a diagram showing all the call reasons that have been discovered, in accordance with some embodiments of the present invention.

According to some embodiments of the present disclosure, all the contact reasons that have been identified, for all the instances in the random sample, may be presented with their probability distribution. UI 900B may be used by an analyst for selection of another contact reason when the analyst is not satisfied with the contact reason that was assigned to the routine automatically, for example, by a system such as system 100B.

FIG. 10 schematically illustrates a high-level diagram 1000 of a sequence of user desktop actions which were operated via an application or across applications during the interaction by the agent to carry out the business process, in accordance with some embodiments of the present invention.

According to some embodiments of the present disclosure, the AF server that is associated to an AF portal 350 in FIG. 3B may send a repetitive sequence of user desktop actions, such as sequence 1010-1050 to an automation development environment where the repetitive sequence may be translated to a set of corresponding objects inside the environment for developing attended and unattended process automations. The environment for developing attended and unattended process automations may be a cloud-based environment.

According to some embodiments of the present disclosure, the repetitive sequence of user desktop actions operated via an application or across applications to carry out the business process, e.g., 1010-1050 may be translated to a set of corresponding objects in an automation tool. The objects, such as workflow steps functions and screen elements, may be compiled to .net code which contains a set of instructions that a real time framework can then executes at runtime as a dynamic linked library either on an agent's desktop environment that allows communications with one or more applications or in another computer deployed within the organization software environment.

According to some embodiments of the present disclosure, an example of the translated set of corresponding objects of the automated user desktop actions 1010-1050, that may be automatically performed, based on an identified analyzed process instance may be:

Copying data of textBoxContactStreet, textBoxContactCity, comboBoxContactState, textBoxContactZip, textBoxContactFirstName, textBoxContactLastName, textBoxContactEmail and textBoxContactPhone on screen "Training CRM-Contacts".

Pasting data into Street, City, State/Province and Postal Code on screen "Timothy Mercado Properties".

Clicking on New Tab on screen "Get in touch".

Clicking on Data Collection on screen "Customers-Week *-December-All Do . . . ".

Pasting data into INPUT on screen "Contact Book" and Typing text in INPUT on screen "Contact Book".

Figure 11A:
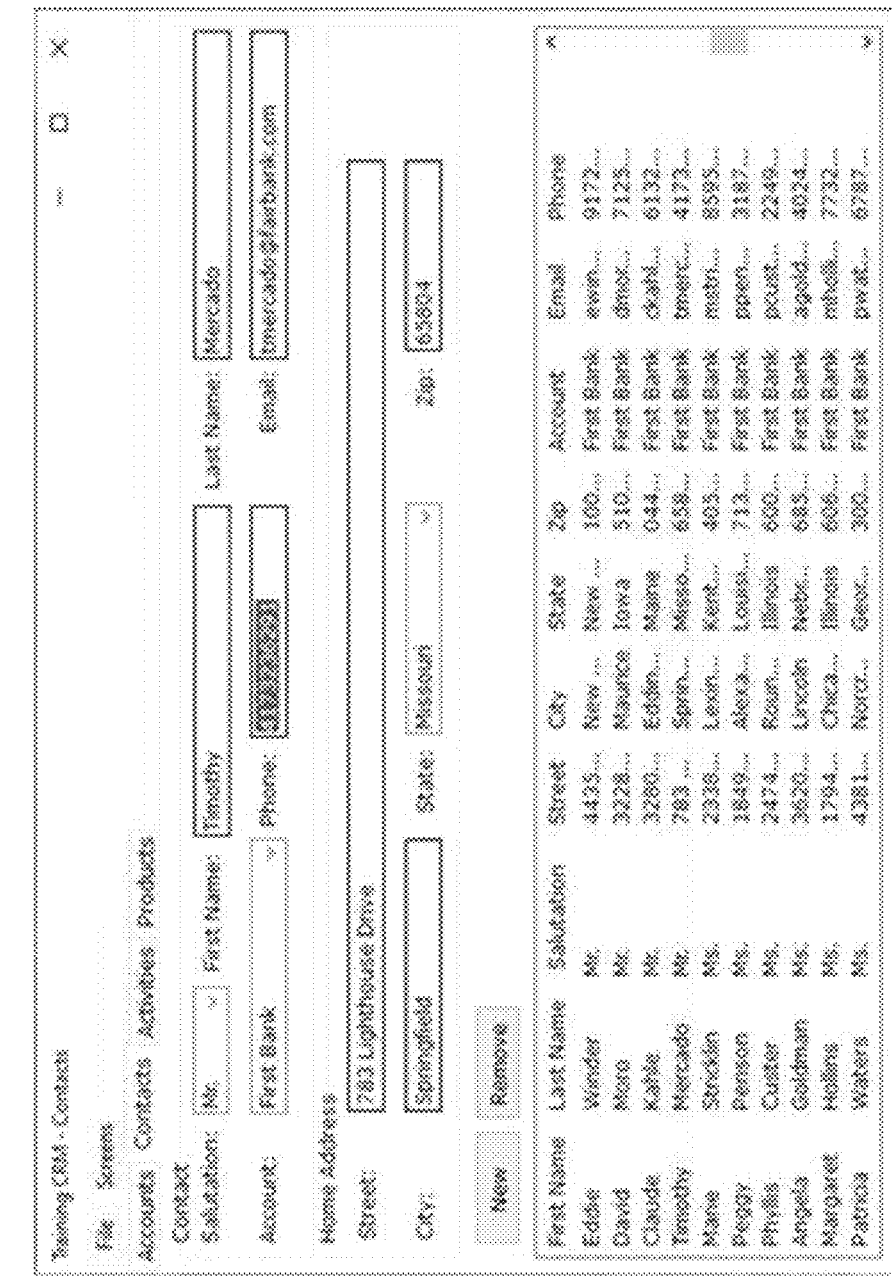
FIG. 11A is a screenshot of a UI that is associated to the desktop analytics tool showing the UI after copying data on screen "Training CRM—Contacts", in accordance with some embodiments of the present invention.

FIG. 11A is a screenshot of a UI 1100A that is associated to the desktop analytics tool showing the UI after copying data on screen "Training CRM-Contacts", in accordance with some embodiments of the present invention.

According to some embodiments of the present disclosure, the screenshot of a UI 1100A shows the UI 1100A after the user desktop action Copying data on screen "Training CRM-Contacts" 1010 in FIG. 10, after an automated instruction that includes the following user desktop actions:

Copy from field "textBoxContactStreet" (**** Merivale Road)
Copy from field "textBoxContactCity" (Eddington)
Copy from field "textBoxContactStreet" (*** Lighthouse Drive)
Copy from field "textBoxContactCity" (Springfield)
Copy from field "comboBoxContactState" (Missouri)
Copy from field "textBoxContactZip" (*****)
Copy from field "textBoxContactFirstName" (Timothy)
Copy from field "textBoxContactLastName" (Mercado)
Copy from field "textBoxContactEmail" (tmercado@fairbank.com)
Copy from field "textBoxContactPhone" (**********)

Figure 11B:
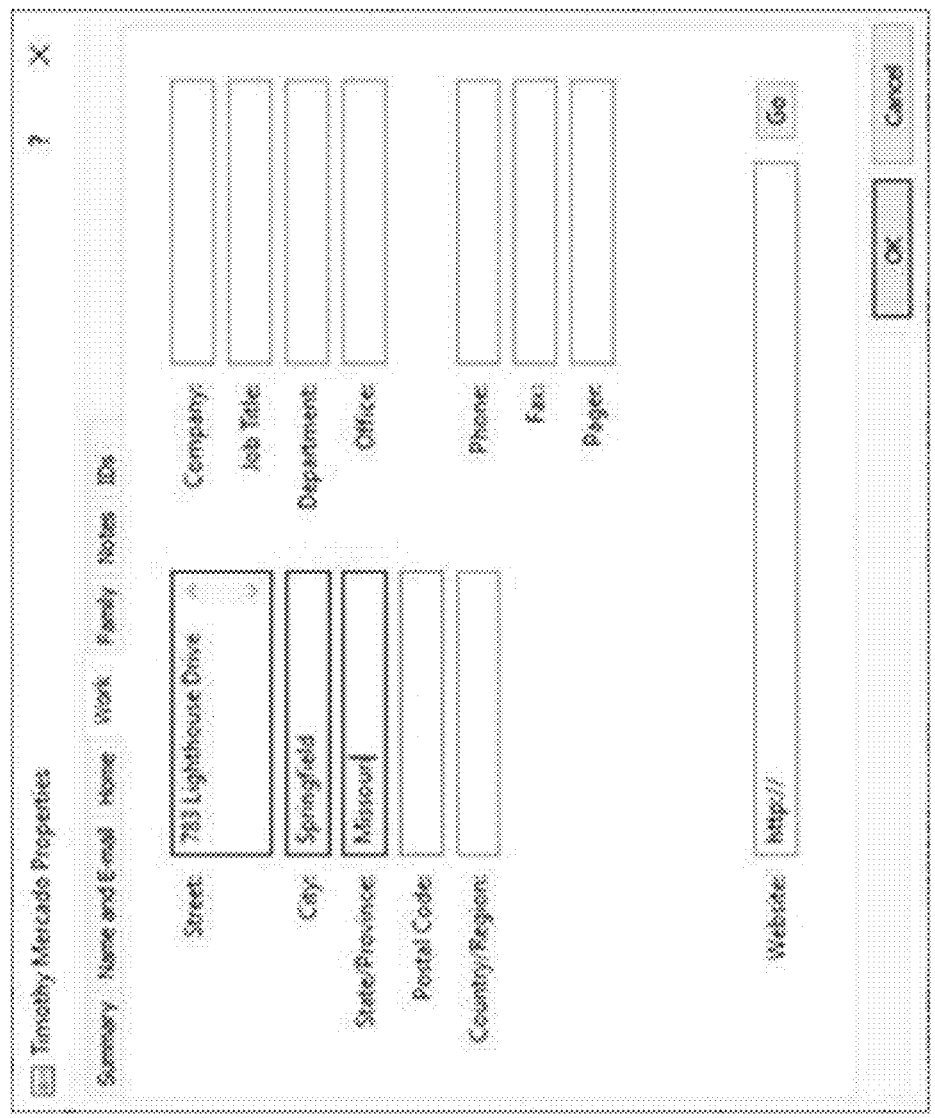
FIG. 11B is a screenshot of a UI that is associated to the desktop analytics tool showing the UI after pasting data on screen "Timothy Mercado Properties", in accordance with some embodiments of the present invention.

FIG. 11B is a screenshot of a UI 1100B that is associated to the desktop analytics tool showing the UI after pasting data on screen "Timothy Mercado Properties", in accordance with some embodiments of the present invention.

According to some embodiments of the present disclosure, the screenshot of a UI 1100B shows the UI 1100B after the user desktop action Pasting data on screen "Timothy Mercado Properties" 1020 in FIG. 10, after an automated instruction that includes the following user desktop actions:

Pasting data on screen "Timothy Mercado Properties"
Paste to field "Street" (**** Merivale Road)
Paste to field "Street" (*** Lighthouse Drive)
Paste to field "City" (Springfield)
Paste to field "State/Province" (Missouri)
Paste to field "Postal Code" (*****)

Figure 11C:
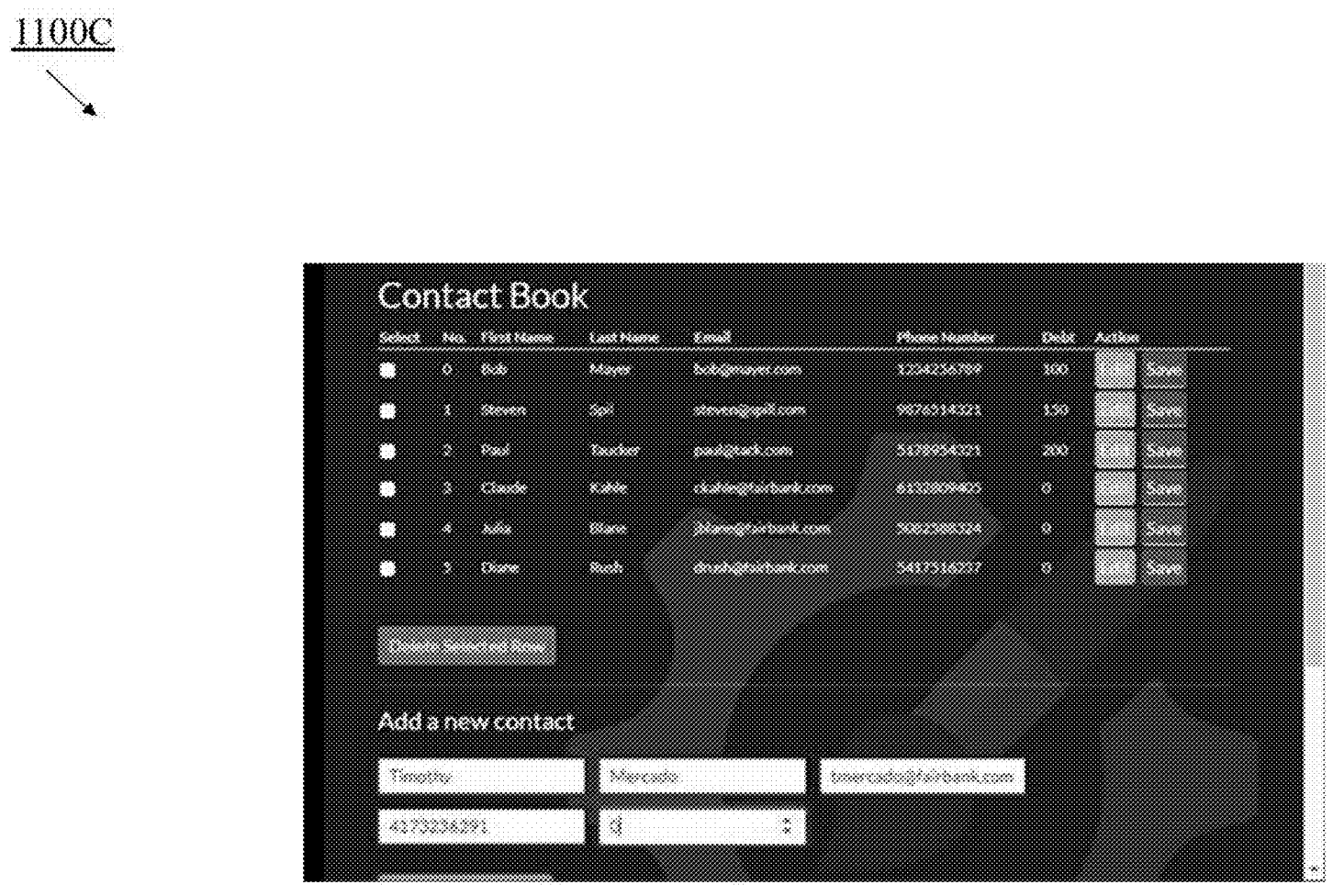

FIG. 11C is a screenshot of a UI 1100C that is associated to the desktop analytics tool showing the UI after pasting data and typing text on screen "Contact book", in accordance with some embodiments of the present invention.

According to some embodiments of the present disclosure, the screenshot of a UI 1100B shows the UI 1100B after the user desktop action Clicking on screen "Get in touch" 1030 in FIG. 10, after an automated instruction that includes the following user desktop actions: Clicking on screen "Get in touch|Customers—week*-December—All do . . . ", 1040 in FIG. 10, after an automated instruction that includes the following user desktop actions: Click on field "New Tab", that is followed by the user desktop action Clicking on screen "Customers-Week *-December—All Do . . . " Click on field "Data Collection" followed by the user desktop action Pasting data and Typing text on screen "Contact Book", 1050 in FIG. 10, after an automated instruction that includes the following user desktop actions:

Paste to field "INPUT" (Timothy)
Paste to field "INPUT" (Mercado)
Paste to field "INPUT" (tmercado@fairbank.com)
Paste to field "INPUT" (**********)
Typing into "INPUT" (*)

FIG. 12 is an example of a transcription 1200, in accordance with some embodiments of the present invention.

According to some embodiments of the present disclosure, transcription 1200 is an example of a text interaction transcription, such as transcription 310c in FIG. 3C, which may be retrieved by a system, such as system 100B in FIG. 1B, for an instance in a random sample of instances that relates to a discovered-routine. An associated contact reason may be generated by providing a GEN AI with LLM with a related transcript-segment the following prompt:

Generate only the contact reasons of the content of the following {related transcript-segment}, if there is more than one contact reason summarize call reasons to 2 or 3 items.

The output of the Gen AI with LLM may be:

Debit Card not working

Unexpected fee charged on the account (related to international transaction).

According to some embodiments of the present disclosure, an associated title may be generated by providing a GEN AI with LLM with a related transcript-segment the following wrapped input request as a prompt:

Generate a one sentence title with up to 7 words of the content of the following {transcription}

The output of the Gen AI with LLM may be:

"Debit Card Issue and Fee Resolution Call"

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for identifying a contact reason of a business process that has been discovered by a desktop analytics tool, said computerized-method comprising:
   (i) monitoring each interaction between an agent and a customer in a contact center to:
      a. generate a related interaction-transcription of the interaction and store the related interaction-transcription by an analytics Application Programming Inter (API); and
      b. collect and store a sequence of user desktop actions which were operated via an application or across applications during the interaction by the agent to carry out the business process;
   (ii) operating the desktop analytics tool to find a repetitive sequence of user desktop actions which were operated via the application or across the applications during the interaction; and to determine the repetitive sequence of user desktop actions as a discovered-routine for automation of the business process,
      wherein each sequence of the repetitive sequence of user desktop actions is stored as an instance of the discovered-routine in a routines-datastore by the desktop analytics tool, with an associated, agent-id, start-timestamp, and end-timestamp;
   (iii) retrieving a random sample of a preconfigured number of instances of the discovered-routine from the routines-datastore;
   (iv) for each instance in the random sample of the preconfigured number of instances matching a related transcript-segment;
   (v) identifying a contact reason of each instance by operating a first Generative (GEN) Artificial intelligence (AI) with Large Language model (LLM) with a first prompt-text including an embedded related transcript-segment,
      wherein the first GEN AI with LLM has been trained to provide the contact reason based on the transcript-segment which is embedded in the first prompt-text; and
   (vi) identifying the contact reason of the discovered-routine as the contact reason of the business process by operating a second GEN AI with LLM with a second prompt-text for aggregation of all the contact reasons of all instances in the random sample,
      wherein the second GEN AI with LLM has been trained to provide a contact reason based on the contact reasons of all instances which are embedded in the second prompt-text.

2. The computerized-method of claim 1, wherein the matching of the related transcript-segment comprising:
   a. retrieving the agent-id, start-timestamp, and end-timestamp that are associated to the instance, from the routines-datastore;
   b. retrieving an interaction-id that is associated to the instance based on the retrieved agent-id, start-timestamp, and end-timestamp from an interactions API;
   c. retrieving a related interaction-transcription based on the retrieved interaction-id, from the analytics API; and
   d. extracting from the related interaction-transcription the transcript-segment based on the instance associated, start-timestamp, and end-timestamp.

3. The computerized-method of claim 1, wherein the extracting of the transcript-segment from the related interaction-transcription, comprising:
   (i) calculating a segment-start-time of the transcript-segment by decreasing a first-preconfigured amount of time from the start-timestamp of the instance to yield interaction-transcript start-timestamp;
   (ii) determining a first-line-text in the interaction-transcription as a start-line of the transcript-segment based on the yielded interaction-transcript start-timestamp;
   (iii) calculating a segment-end-time of the transcript-segment by increasing a second-preconfigured amount of time from the end-timestamp of the instance to yield interaction-transcript end-timestamp;
   (iv) determining a second-line-text in the interaction-transcription as an end-line of the transcript-segment based on the yielded interaction-transcript end-timestamp; and
   (v) extracting the transcript-segment from the interaction-transcript based on the first-line-text and the second-line-text,
   wherein the interaction-transcription is labeled with a start-timestamp and end-timestamp related to the interaction per each line-text of the interaction-transcription.

4. The computerized-method of claim 1, the computerized-method further comprising:
   (i) identifying an instance-title of each instance by operating a third GEN AI LLM with a third prompt-text including an embedded related transcript-segment,
      wherein the third GEN AI with LLM has been trained to provide the instance-title based on the transcript-segment which is embedded in the third prompt-text, and wherein the identified instance-title includes up to a preconfigured number of words; and
   (ii) identifying a title of the discovered-routine as the title of the business process by operating a fourth GEN AI with LLM with a fourth prompt-text for aggregation of all instance-titles of all instances in the random sample,
      wherein the fourth GEN AI with LLM has been trained to provide the title based on the instance-titles of all instances which are embedded in the fourth prompt-text.

5. The computerized-method of claim 1, wherein the identified contact reason of the discovered-routine is stored in a business-processes database with an associated generated automated routine.

6. The computerized-method of claim 5, wherein the computerized-method further comprising generating the automated routine by: (i) translating the user desktop actions operated via an application or across applications to carry out the business process to a set of corresponding objects in a automation tool; and (ii) compiling the objects to a code that includes a set of instructions to be executed at runtime as a dynamic linked library in a desktop environment that allows communications with one or more applications.

7. The computerized-method of claim 6, wherein the computerized-method further comprising:
   for each new inbound-interaction:
   (i) identifying the contact reason by operating the first GEN AI with LLM with the first prompt-text including an embedded transcript of the new inbound-interaction; and
   (ii) triggering the stored generated automated routine that is associated to the identified contact reason,
      wherein the triggering of the stored generated automated routine comprising executing the code of the associated generated automated routine at runtime as the dynamic linked library in the desktop environment that allows communication with one or more applications.

8. The computerized-method of claim 1, wherein the first GEN AI with LLM and the second GEN AI with LLM are trained by an open-source LLM with a first labeled dataset of transcripts, each transcript in the first labeled dataset of transcripts is labeled with a call reason.

9. The computerized-method of claim 4, wherein the third GEN AI with LLM and the fourth GEN AI with LLM are trained by the open-source LLM with a second labeled dataset of transcripts each transcript in the second labeled dataset of transcripts is labeled with a title.

\* \* \* \* \*